US012488519B2

(12) United States Patent
Aubert et al.

(10) Patent No.: US 12,488,519 B2
(45) Date of Patent: Dec. 2, 2025

(54) MEDICAL IMAGING CONVERSION METHOD AND ASSOCIATED MEDICAL IMAGING 3D MODEL PERSONALIZATION METHOD

(71) Applicant: EOS IMAGING, Paris (FR)

(72) Inventors: Benjamin Aubert, Québec (CA); Nasr Makni, Ferney Voltaire (FR); Thierry Cresson, Ottawa (CA); Carlos Alberto Vazquez Hidalgo Gato, Québec (CA); Jacques A. De Guise, Québec (CA)

(73) Assignee: EOS IMAGING, Paris (FR)

( * ) Notice: Subject to any disclaimer, the term of this patent is extended or adjusted under 35 U.S.C. 154(b) by 387 days.

(21) Appl. No.: 17/924,630

(22) PCT Filed: May 13, 2020

(86) PCT No.: PCT/IB2020/000508
§ 371 (c)(1),
(2) Date: Nov. 10, 2022

(87) PCT Pub. No.: WO2021/229253
PCT Pub. Date: Nov. 18, 2021

(65) Prior Publication Data
US 2023/0177748 A1    Jun. 8, 2023

(51) Int. Cl.
*G06K 9/00*     (2022.01)
*G06N 3/0464*   (2023.01)
(Continued)

(52) U.S. Cl.
CPC .......... *G06T 11/008* (2013.01); *G06N 3/0464* (2023.01); *G06T 7/0014* (2013.01);
(Continued)

(58) Field of Classification Search
CPC ....... G06T 11/008; G06T 7/0014; G06T 7/10; G06T 2207/10124; G06T 2207/20081;
(Continued)

(56) References Cited

U.S. PATENT DOCUMENTS

2016/0136458 A1   5/2016   Taguchi
2018/0116620 A1   5/2018   Chen
(Continued)

FOREIGN PATENT DOCUMENTS

| CN | 104025119 A | * | 9/2014 | ........... G06F 19/321 |
| CN | 107169919 A | * | 9/2017 | ........... G06T 11/008 |

(Continued)

OTHER PUBLICATIONS

International Search Report dated Feb. 8, 2021, for PCT/IB2020/000508, 4 pp.
(Continued)

*Primary Examiner* — Xin Jia
(74) *Attorney, Agent, or Firm* — NIXON & VANDERHYE

(57) ABSTRACT

Disclosed is a medical imaging conversion method, automatically converting: at least one or more real x-ray images of a patient, including at least a first anatomical structure of the patient and a second anatomical structure of the patient, into at least one digitally reconstructed radiograph (DRR) of the patient representing the first anatomical structure without representing the second anatomical structure, by a single operation using either one convolutional neural network (CNN) or a group of convolutional neural networks (CNN) which is preliminarily trained to, both or simultaneously: differentiate the first anatomical structure from the second anatomical structure, and convert a real x-ray image into at least one digitally reconstructed radiograph (DRR).

28 Claims, 19 Drawing Sheets

(51) Int. Cl.
*G06T 7/00* (2017.01)
*G06T 7/10* (2017.01)
*G06T 11/00* (2006.01)
*G16H 30/40* (2018.01)

(52) U.S. Cl.
CPC ............... *G06T 7/10* (2017.01); *G16H 30/40* (2018.01); *G06T 2207/10124* (2013.01); *G06T 2207/20081* (2013.01); *G06T 2207/20084* (2013.01); *G06T 2207/30012* (2013.01)

(58) Field of Classification Search
CPC . G06T 2207/20084; G06T 2207/30012; G06T 2207/10081; G06T 2207/20124; G06T 2207/30004; G06T 7/0012; G06N 3/0464; G06N 3/126; G06N 3/045; G06N 3/047; G06N 3/088; G16H 30/40; A61B 6/505; A61B 6/5211
See application file for complete search history.

(56) References Cited

U.S. PATENT DOCUMENTS

| | | |
|---|---|---|
| 2019/0259153 A1 | 8/2019 | Zhang et al. |
| 2020/0058123 A1 | 2/2020 | Liao |
| 2022/0051398 A1 | 2/2022 | Watanabe |

FOREIGN PATENT DOCUMENTS

| | | | | |
|---|---|---|---|---|
| CN | 108601629 A | * | 9/2018 | ............... A61B 6/12 |
| CN | 108961237 A | * | 12/2018 | ............ G06T 11/005 |
| JP | 2016096902 A | | 5/2016 | |
| JP | 2019195627 A | | 11/2019 | |
| JP | 2020062378 A | | 4/2020 | |
| KR | 101953629 B1 | | 3/2019 | |
| WO | 2009/056970 | | 5/2009 | |
| WO | 2019215604 A1 | | 11/2019 | |
| WO | 2020028382 A1 | | 2/2020 | |
| WO | 2020054738 A1 | | 3/2020 | |

OTHER PUBLICATIONS

Written Opinion of the ISA dated Feb. 8, 2021, for PCT/IB2020/000508, 7 pp.

Jalda Dworzak, "3D reconstruction of the human rib cage from 2D projection images using a statistical shape model", Diplomarbeit, Dec. 1, 2009, pp. x-i. Submission Pending.

Cornelius Johannes Frederik Reyneke et al., "Review of 2-D/3-D Reconstruction Using Statistical Shape and Intensity Models and X-Ray Image Synthesis: Toward a Unified Framework", IEEE Reviews in Biomedical Engineering, vol. 12, Oct. 17, 20-18, pp. 269-286. Submission Pending.

P. Isola et al., Image-to-Image Translation with Conditional Adversarial Networks, CoRR, vol. abs/1611.0, 2016. Submission Pending.

B. Aubert et al., "Towards automated 3D Spine reconstruction from biplanar radiographs using CNN for statistical spine model fitting", IEEE Trans. Med. Imaging, 2019, p. 1. Submission Pending.

Jalda Dworzak, "3D Reconstruction of the Human Rib Cage from 2D Projection Images Using a Statistical Shape Model," Diplomarbeit, Dec. 5, 2009, 82 pages.

Cornelius Johannes Frederik Reyneke et al., "Review of 2-D/3-D Reconstruction Using Statistical Shape and Intensity Models and X-Ray Image Synthesis: Toward a Unified Framework," IEEE Reviews in Biomedical Engineering, vol. 12, Date of publication: Oct. 17, 2018, Date of current version: Feb. 15, 2019, pp. 269-286.

P. Isola et al., "Image-to-Image Translation with Conditional Adversarial Networks," ResearchGate, Conference Paper, 2017 IEEE Conference on Computer Vision and Pattern Recognition (CVPR), Jul. 2017, 17 pages.

B. Aubert et al., "Toward Automated 3D Spine Reconstruction from Biplanar Radiographs Using CNN for Statistical Spine Model Fitting," IEEE Trans. Med. Imaging, vol. 38, No. 12, Dec. 2019, p. 2796-2806.

* cited by examiner

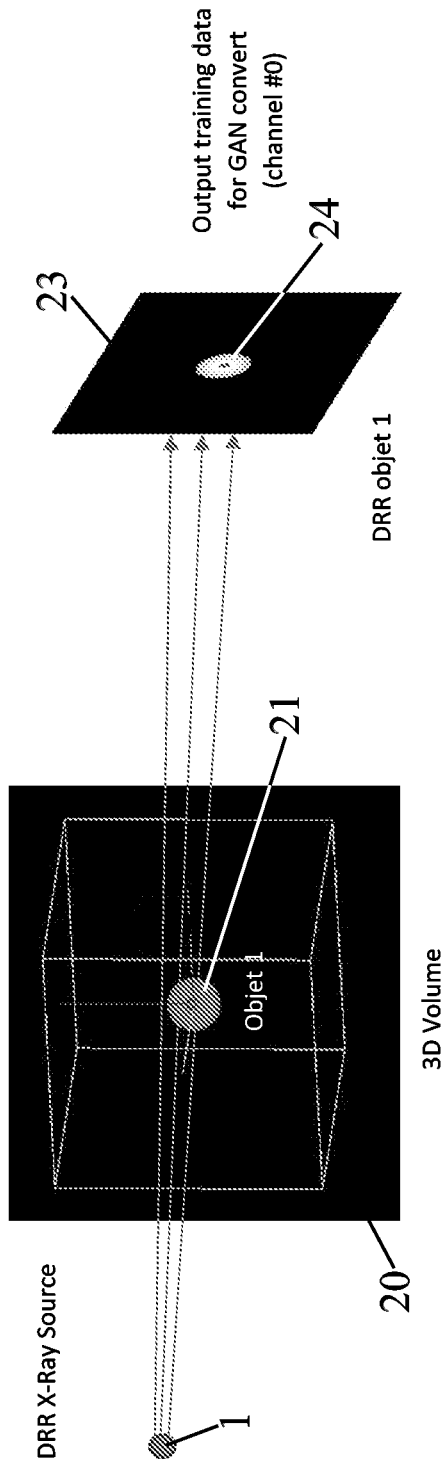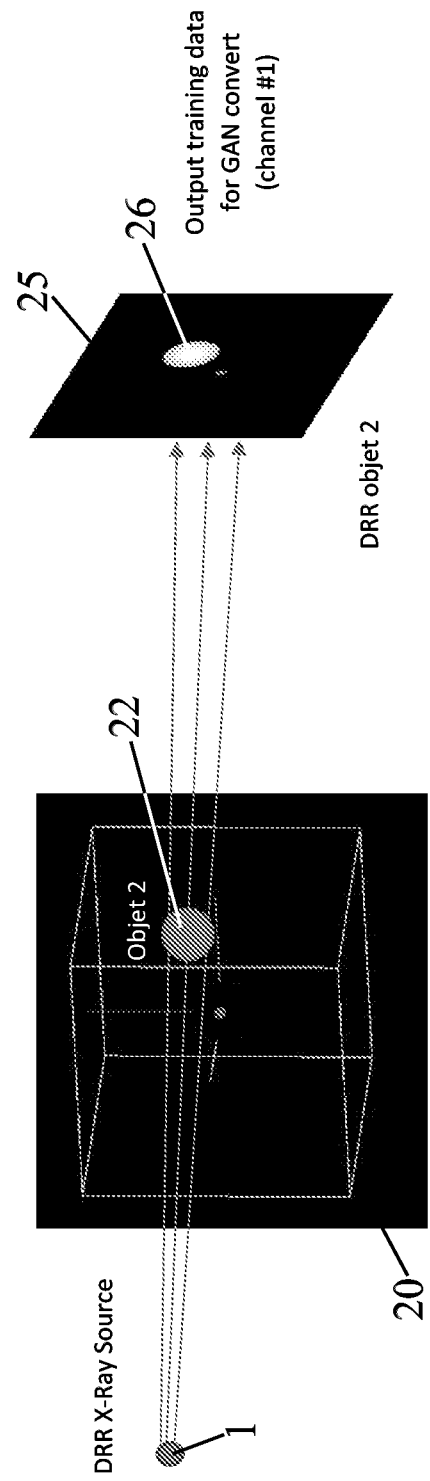

Proposed method

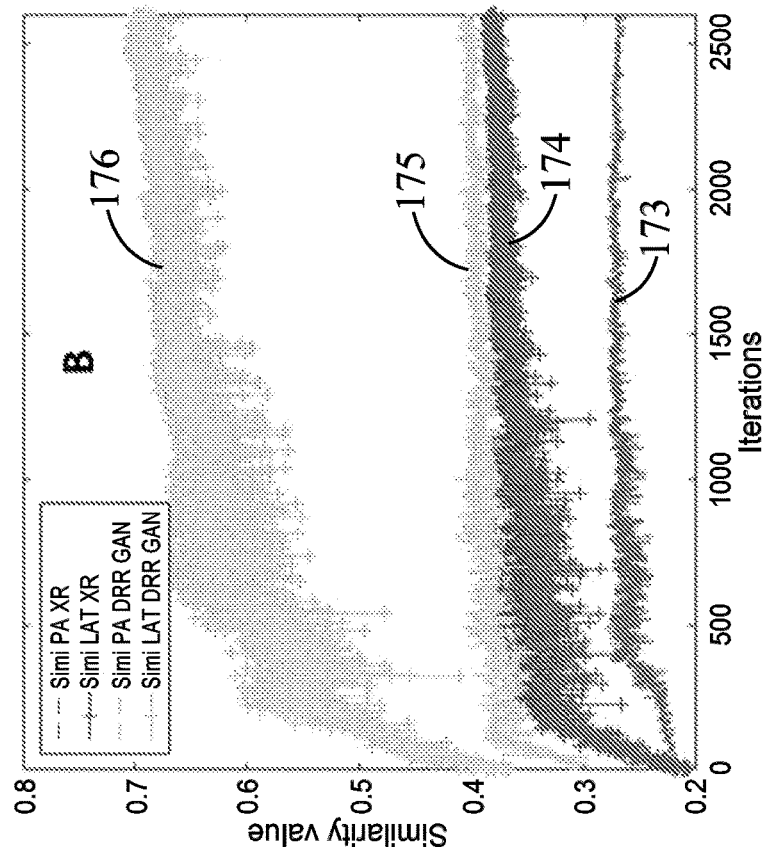
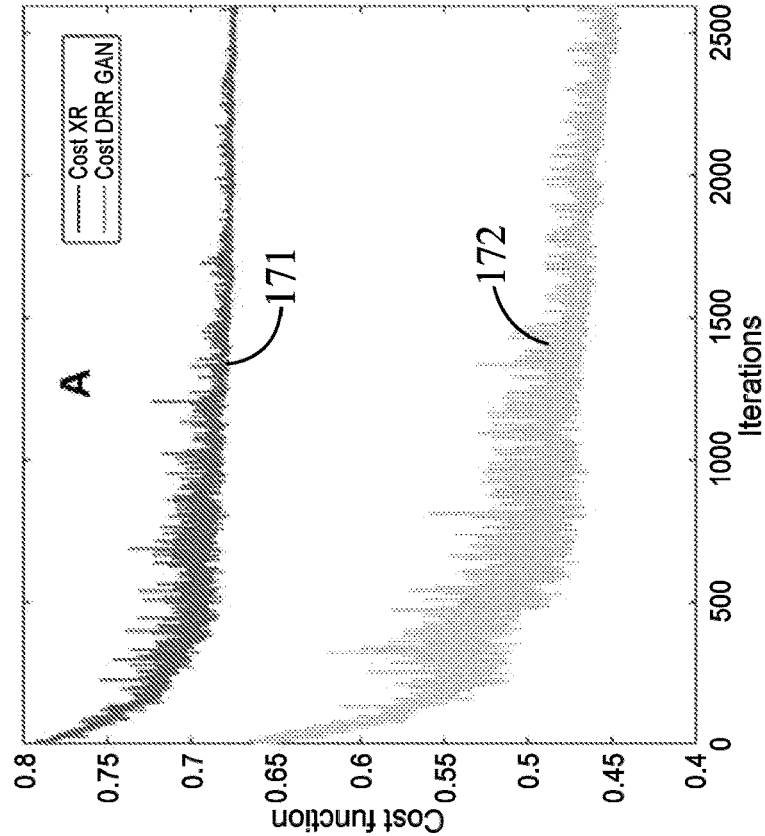
FIG. 14A
FIG. 14B

MEDICAL IMAGING CONVERSION METHOD AND ASSOCIATED MEDICAL IMAGING 3D MODEL PERSONALIZATION METHOD

CROSS-REFERENCE TO RELATED APPLICATION(S)

This application is the U.S. national phase of International Application No. PCT/IB2020/000508 filed May 13, 2020, which designated the U.S. the entire contents of which are hereby incorporated by reference.

FIELD OF THE INVENTION

The invention relates to medical imaging conversion methods.

This invention is also related to associated medical imaging 3D model personalization methods using such medical imaging conversion methods.

BACKGROUND OF THE INVENTION

According to a prior art disclosed in US 2019/0259153, with respect to a medical imaging conversion method, it is known a method to transform a real x-ray image of a patient into a digitally reconstructed radiograph (DRR) by a generative adversarial network (GAN).

However, the obtained digitally reconstructed radiograph (DRR) presents two features:

First, it includes all the organs which were present in the starting x-ray image before transformation by said generative adversarial network (GAN).

Second, if pixel segmentation of a specific organ is needed, this is performed from obtained digitally reconstructed radiograph (DRR) in a subsequent segmentation step by another dedicated convolution neural network (CNN) [see US 2019/0259153 page 1 § 5 and page 4 § 51].

This is considered, according to the invention, as rather complex and not effective enough, because there are several and often even many different anatomical structures within an organ or within a region of a patient body.

The different anatomical structures, whether organs or organ parts or groups of organs, run the risk to be overlapped in the digitally reconstructed radiograph (DRR) because it represents a planar projective view of 3D structures.

SUMMARY OF THE INVENTION

The object of the present invention is to alleviate at least partly the above-mentioned drawbacks.

On the contrary to cited prior art, according to the spirit of the present invention, in a dual DRR image matching process, it is considered as beneficial that each DRR represents a unique organ or anatomical part of an organ in order to avoid mismatching on adjacent or superimposed organs or organ structures.

However, in the prior art, the transformation process does not allow this structure isolation for overlapped organ regions because pixel classification resulting from a segmentation of the global obtained DRR including all organs is not enough to discriminate the respective amount of DRR image signal belonging to each organ or to each organ structure. Therefore, the subsequent extraction of regional DRR(s), having only one organ represented for each, from the global obtained DRR is thereby impossible, at least without loss of useful signal.

Therefore, according to the invention, a method is proposed to transform a real x-ray image of a patient, either into a single regional digitally reconstructed radiograph (DRR) or into a set of regional digitally reconstructed radiographs (DRR,) by a single generative adversarial network (GAN), which both:

is trained from DRR generated by isolating structure directly in original 3D volume,
produces simultaneously a set of several DRR, each of them focused on only one anatomical structure of interest, or one DRR but which is only focused on one anatomical structure of interest excluding the other anatomical structures,
via a single operation of a single and unique GAN, therefore optimizing simultaneously both translation function and structure separation function.

This object is achieved with a medical imaging conversion method, automatically converting: at least one or more real x-ray images of a patient, including at least a first anatomical structure of said patient and a second anatomical structure of said patient, into at least one digitally reconstructed radiograph (DRR) of said patient representing said first anatomical structure without representing said second anatomical structure, by a single operation using either one convolutional neural network (CNN) or a group of convolutional neural networks (CNN) which is preliminarily trained to, both or simultaneously: differentiate said first anatomical structure from said second anatomical structure, and convert a real x-ray image into at least one digitally reconstructed radiograph (DRR).

Preferably, medical imaging conversion method according to the invention also automatically converts: said real x-ray image of said patient, into at least another digitally reconstructed radiograph (DRR) of said patient representing said second anatomical structure without representing said first anatomical structure, by said same single operation, where said either one convolutional neural network (CNN) or group of convolutional neural networks (CNN) is preliminarily trained to, both or simultaneously: differentiate said first anatomical structure from said second anatomical structure, and convert a real x-ray image into at least two digitally reconstructed radiographs (DRR).

This means that from one global x-ray image, representing several different organs or several different parts of an organ or several groups of organs, several regional DRR images are obtained, by a single operation of conversion, including both steps of translation function and structure separation function, by a single convolutional neural network or group of convolutional neural networks linked together thereto, corresponding respectively to and representing respectively these several different organs or several different parts of an organ or several groups of organs.

This allows for each different organ or each different part of an organ or each group of organs, to be represented separately from all the other different organs or all the other different parts of an organ or all the other groups of organs, without losing useful information in the zones where there is some overlapping or where there may be some overlapping on real x-ray image or where there would be some overlapping on converted global DRR, between these several different organs or several different parts of an organ or several groups of organs.

Indeed, once a global DRR is obtained from one or more real x-ray images, the overlapping between several different organs or several different parts of an organ or several groups of organs, can no more be undone without loss of useful information, these overlapping several different organs or several different parts of an organ or several groups of organs can no more be separated from one another without loss of useful information, because on the DRR, i.e. on the image in this converted DRR domain, these overlapping several different organs or several different parts of an organ or several groups of organs are indissociably mixed all together, any specific pixel being a mixture of the different contributions coming from these overlapping several different organs or several different parts of an organ or several groups of organs without any way to distinguish afterwards between these different contributions or at least with great difficulty to distinguish afterwards between these different contributions leading anyway to unsatisfactory result.

Therefore, this implementation of the invention performs a unique simple and more effective way, not only to translate an image from a first domain, for instance x-ray image, to a second domain, for instance DRR, but also to separate the otherwise overlapping several different organs or several different parts of an organ or several groups of organs without losing useful information, i.e. without substantially degrading the original image quality.

These several different organs or several different parts of an organ or several groups of organs are examples of different anatomical structures.

This object is also achieved with a medical imaging conversion method, automatically converting: at least one or more real x-ray images of a patient, including at least a first anatomical structure of said patient and a second anatomical structure of said patient, both into at least a first and a second digitally reconstructed radiographs (DRR) of said patient: said first digitally reconstructed radiograph (DRR) representing said first anatomical structure without representing said second anatomical structure, said second digitally reconstructed radiograph (DRR) representing said second anatomical structure without representing said first anatomical structure, by a single operation using either one convolutional neural network (CNN) or a group of convolutional neural networks (CNN) which is preliminarily trained to, both or simultaneously: differentiate said first anatomical structure from said second anatomical structure, and convert a real x-ray image into at least two digitally reconstructed radiographs (DRR).

Another similar object is achieved with a medical imaging conversion method, automatically converting: at least one or more images of a patient in a first domain, including at least a first anatomical structure of said patient and a second anatomical structure of said patient, into at least an image of said patient in a second domain, representing said first anatomical structure without representing said second anatomical structure, by a single operation using either one convolutional neural network (CNN) or a group of convolutional neural networks (CNN) which is preliminarily trained to, both or simultaneously: differentiate said first anatomical structure from said second anatomical structure, and convert an image in a first domain into at least one image in a second domain.

Another similar object is achieved with a medical imaging conversion method, automatically converting: at least one or more global images of a patient in a first domain, including at least several different anatomical structures of said patient, into several regional images of said patient in a second domain, representing respectively said different anatomical structures, by a single operation using either one convolutional neural network (CNN) or a group of convolutional neural networks (CNN) which is preliminarily trained to, both or simultaneously: differentiate said anatomical structures from one another, and convert an image in a first domain into at least one image in a second domain.

Another complementary object of the invention will be related to previously cited objects of the invention, because it is a preferred application of the invention. Indeed, this invention is also related to an associated medical imaging 3D model personalization method which uses and takes advantage of the medical imaging conversion method which is the main object of the invention, and which especially takes advantage of its ability to separate the different anatomical structures from one another, without loss of useful information due to possible overlapping between these different anatomical structures.

This complementary object of the invention is a medical imaging 3D model personalization method comprising a medical imaging conversion method according to the invention, wherein: a 3D generic model is used to generate: at least one or more digitally reconstructed radiographs (DRR) of a frontal view of said patient, representing respectively said one or more anatomical structures of said patient, and at least one or more digitally reconstructed radiographs (DRR) of a lateral view of said patient, representing respectively said one or more anatomical structures of said patient, a frontal real x-ray image is converted, by said medical imaging conversion method, into: at least one or more digitally reconstructed radiographs (DRR) of a frontal view of said patient, representing respectively said one or more anatomical structures of said patient, a lateral real x-ray image is converted, by said medical imaging conversion method, into: at least one or more digitally reconstructed radiographs (DRR) of a lateral view of said patient, representing respectively said one or more anatomical structures of said patient, and wherein: said at least one or more digitally reconstructed radiographs (DRR) of a frontal view of said patient, representing respectively said one or more anatomical structures of said patient and obtained from said 3D generic model, are respectively mapped with said at least one or more digitally reconstructed radiographs (DRR) of a frontal view of said patient, representing respectively said one or more anatomical structures of said patient and obtained from said frontal real x-tray image, and said at least one or more digitally reconstructed radiographs (DRR) of a lateral view of said patient, representing respectively said one or more anatomical structures of said patient and obtained from said 3D generic model, are respectively mapped with said at least one or more digitally reconstructed radiographs (DRR) of a lateral view of said patient, representing respectively said one or more anatomical structures of said patient and obtained from said lateral real x-tray image, so as to generate a 3D patient specific model from said 3D generic model.

Mapping can be done via an elastic mapping or via an elastic registering.

Preferably, said 3D generic model is a surface or a volume representing a prior shape that can be deformed using a deformation algorithm.

Preferably, the process of deforming a generic model to obtain the personalized model to a patient is said a deformation algorithm. The association of a generic model with a deformation algorithm is a deformable model.

Preferably, said deformable model is a statistical shape model (SSM).

A statistical shape model is a deformable model based on statistics extracted from a training database to capture the shape deformation patterns. A statistical shape model can directly infer a plausible shape instance from a reduced set of parameters.

Hence, the 3D patient specific model which has been reconstructed is:
  simpler than any model coming from computed tomography (CT) or magnetic resonance imaging (MRI),
    since got from a 3D generic or a deformable model and two simple orthogonal real x-ray images,
  more specific and more precise,
    since implicitly and initially containing from the beginning a volume information because of the frontal and lateral starting views to be converted, as well as being related to the 3D generic model, or to the deformable model or to the statistical shape model, as the case may be.
  the different anatomical structures can be separated from one another, without loss of useful information, to the contrary of the conversion method used in cited prior art which is also by the way more complex to implement.

Previously cited prior art in US 2019/0259153 does not disclose such a complementary object, such as 3D/2D elastic registration, and especially not such as cross domain image similarity for cross multi-structure 3D/2D elastic registration, as in present invention, since its application field is completely different, being based on performing "a posteriori" segmentation using a dense image-to-image network of the task driven generative adversarial network (GAN) having beforehand translated a global x-ray image encompassing several anatomical structures into a DRR encompassing the same plurality of anatomical structures.

The robustness of intensity-based 3D/2D registration of a 3D model on a set of 2D x-ray images also depends on the quality of image correspondences between the actual images and the digitally reconstructed radiographs (DRR) generated from the 3D model. The trend to improve the similarity level between both images in this multimodal registration situation consists in generating DRRs as realistic as possible, i.e. as close as possible to actual x-ray image. This involves two key aspects which are, first having soft tissues and bones 3D models enriched with accurate density information for all involved structures, and second a sophisticated projection process considering physical phenomena of interactions with matters.

On the contrary, in the method proposed by embodiments of the invention, the opposite approach of bringing the actual x-ray images to DRR image domain is done using cross modality image to image translation. Adding a prior step of image to image translation, based on GAN pix-to-pix model, allows to use a simple and fast DRR projection process without complex phenomena simulations. Indeed, even using simple metric, the similarity measures become efficient since both images to match belong to the same domain and essentially contain the same kind of information. The proposed medical imaging conversion method also addresses the well-known issue of registering an object in a scene composed of multiple objects. Using a separate convolution neural network (CNN) output channel for each structure in the XRAY-to-DRR converters allows to separate the superimposed adjacent objects from one another and to avoid similar structure mismatching in the registration. The method proposed by embodiments of the invention is applied to the challenging 3D/2D elastic registration of vertebra 3D models in bi-planar radiographs of the spine. Using the step of XRAY-to-DRR translation enhances the registration results and decreases the dependence on the similarity measure choice as the multimodal registration becomes mono-modal.

Preferred embodiments comprise one or more of the following features, which can be taken separately or together, either in partial combination or in full combination, with anyone of formerly cited objects of the invention.

Preferably, said either one convolutional neural network (CNN) or group of convolutional neural networks (CNN) is a single generative adversarial network (GAN).

Hence, the simplicity of the proposed conversion method is even improved, while still keeping its effectiveness.

Preferably, said single generative adversarial network (GAN) is a U-Net GAN or a Residual-Net GAN.

Preferably, said real x-ray image of said patient is a direct capture of said patient by an x-ray imaging apparatus.

Hence, the image in the first domain to be converted, is altogether simple to get and fully patient specific.

Preferably, said first and second anatomical structures of said patient are anatomical structures which are: neighbors to each other on said real x-ray image, or even adjacent to each other on said real x-ray image, or even touching each other on said real x-ray image, or even at least partly superposed on said real x-ray image.

Hence, the proposed conversion method is all the more interesting than the different anatomical structures to be separated from one another are indeed close to one another, since quantity of mixed information between them that cannot be separated anymore would then be higher.

Preferably, only one of said at least two digitally reconstructed radiographs (DRR) can be used for further processing.

Hence, the proposed conversion method can be used even if only one DRR is indeed needed by the practitioner.

Preferably, all of said at least two digitally reconstructed radiographs (DRR) can be used for further processing.

Hence, the proposed conversion method can be used especially if all DRR are indeed useful for the practitioner.

Preferably, said real x-ray image of a patient includes at least three anatomical structures of said patient, and preferably only three anatomical structures of said patient, said real x-ray image is converted, by said single operation, into at least three separate digitally reconstructed radiographs (DRR) representing respectively said at least three anatomical structures, each of said digitally reconstructed radiographs (DRR) representing only one of said anatomical structures without representing any other one of said anatomical structures, and preferably into only three separate digitally reconstructed radiographs (DRR) representing respectively only said three anatomical structures.

Hence, the proposed conversion method is optimized in two ways:
  first, using its two closest neighbors (especially in a linear structure as a patient spine) helps to better separate and individualize the specific anatomic structure of interest,
  whereas second, using only its two closest neighbors helps to perform that with a still relatively simple implementation.

Preferably, said either one convolutional neural network (CNN) or group of convolutional neural networks (CNN) has been preliminarily trained, by a set of training groups of: one real x-ray image, and at least one or more corresponding digitally reconstructed radiographs (DRR) each representing only one of said anatomical structures, but representing no other anatomical structure of said patient.

Hence, the proposed conversion method can be trained with paired images in first domain to convert and in second domain to be converted into.

Preferably, said either one convolutional neural network (CNN) or group of convolutional neural networks (CNN) has been preliminarily trained, by a set of: real x-ray images, and several subsets of at least one or more digitally reconstructed radiographs (DRR), each of said digitally reconstructed radiographs (DRR) representing only one of said anatomical structures, but representing no other anatomical structure of said patient.

Hence, the proposed conversion method can be trained with unpaired images in first domain to convert and in second domain to be converted into.

Preferably, said either one convolutional neural network (CNN) or group of convolutional neural networks (CNN) has been preliminarily trained, by a set of training groups of: both one frontal real x-ray image and one lateral real x-ray image, and at least one or more subsets of frontal and lateral corresponding digitally reconstructed radiographs (DRR), each said subset representing only one of said anatomical structures, but representing no other anatomical structure of said patient.

Hence, the proposed conversion method can be trained with paired groups of both frontal and lateral images in first domain to convert and in second domain to be converted into, each pair of frontal and lateral images being converted in several pairs of frontal and lateral images, one converted pair of frontal and lateral images corresponding to one anatomical part separated from the other anatomical parts.

Preferably, said digitally reconstructed radiographs (DRR) of said training groups come from a 3D model specific to said patient via its adaptation to two real x-rays images taken along two orthogonal directions.

Hence, the compromise between, on the one side simplicity of the model used to create the training DRR, and on the other side the effectiveness of the model, because of its precise dedication to the specific patient contemplated, is optimized.

Preferably, said different anatomical structures of said patient are contiguous vertebra of said patient.

Hence, the proposed conversion method is all the more interesting than the different anatomical structures to be separated from one another are indeed close from one another, since quantity of mixed information between them that cannot be separated anymore would then be higher.

Preferably, said different and contiguous vertebra of said patient are located within a single and same region of patient spine among: either a region of upper thoracic patient spine segment, or a region of lower thoracic patient spine segment, or a region of lumbar patient spine segment, or a region of cervical patient spine segment, or a region of patient pelvis.

Preferably, said different anatomical structures of said patient are located within a single and same region of patient among: either a region of patient hip, or a region of patient lower limbs, such as femur or tibia, or a region of patient knee, or a region of patient shoulder, or a region of patient rib cage.

Preferably, each of said different digitally reconstructed radiographs (DRR) representing respectively said different anatomical structures of said patient includes simultaneously: an image having pixels presenting different gray levels, at least one tag representing anatomical information relative to anatomical structure it represents.

Hence, this tag will be used to distinguish between the different anatomical structures and to separate these different anatomical structures from one another. This tag is a simple and effective way to separate information corresponding respectively to different anatomical structures when it was still possible to do so, i.e. in the 3D volume, before these images in the first domain, here x-ray images, preferably frontal and lateral x-ray images, are converted in the second domain, here DRR, where it would no more be possible to distinguish between these different anatomical structures and to separate these different anatomical structures from one another, if such distinction has not been made before.

Preferably, said image is a 256×256 pixels square image.

Hence, this a good compromise between quality of image on the one side and processing complexity as well as requested storage capabilities on the other side.

Preferably, said either one convolutional neural network (CNN) or group of convolutional neural networks (CNN) has been preliminarily trained on x-ray images, both real x-ray images and transformations of real x-ray images, of a number of different patients ranging from 100 to 1000, and preferably ranging from 300 to 700, more preferably about 500.

Hence, this is a simple and effective way to offer for training quite a big number of training images which are sufficiently differentiated from one another, while at the same time having at disposal quite a limited amount of data to build up these training images.

There is also an optimum in ranges of numbers of training images; indeed, when using a reasonable range of training images, one gets a nearly optimal effectiveness at a quite reasonable cost.

Preferably, at least both a frontal real x-ray image of a patient and a lateral real x-ray image of said patient are converted, both said x-ray images each including same said anatomical structures of said patient.

Hence, using as images to be converted both frontal and lateral real x-ray images allows both for getting frontal and lateral DRR and for improving precision of created DRR, since the anatomical structures can be more precisely known from two orthogonal views and even possibly reconstructed in three-dimensional space (3D), for instance with the help of a 3D generic model, or with the help of a deformable model, or with the help of a statistical shape model as the case may be.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 2A shows a first step of making a regional DRR of a first anatomical structure for training of a GAN, during the training phase according to an embodiment of the invention.

FIG. 2B shows a second step of making another regional DRR of a second anatomical structure for training of a GAN, during the training phase according to an embodiment of the invention.

DETAILED DESCRIPTION OF THE INVENTION

All subsequent description will be made with reference to a body representation with several different organs, but it could have been made all the same with a body representation with several different groups of organs or even an organ representation with several different parts of this organ.

Posterior-anterior (PA) is identical to frontal (FRT) view, both as opposed to lateral (LAT) view, since lateral view is along a direction orthogonal to the common direction of posterior-anterior view and frontal view.

Figure 1A:
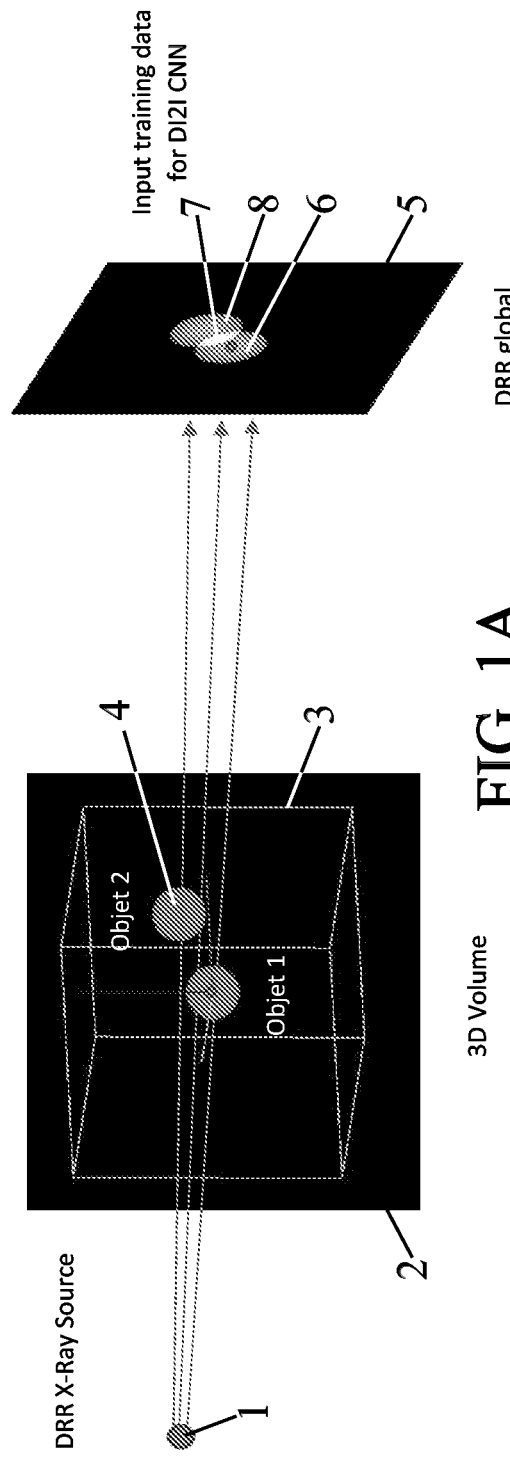
FIG. 1A shows a first step of making a global DRR for training of a GAN, during training phase according to prior art.

FIG. 1A shows a first step of making a global DRR for training of a GAN, during training phase according to prior art.

From a DRR x-ray source 1, ray casting is performed through a 3D volume 2 containing two different organs, a first organ 3 and a second organ 4.

First organ 3 and second organ 4 have planar projections on a global DRR 5, respectively contribution of DRR image signal 6 from the first organ 3 and contribution of DRR image signal 7 from the second organ 4.

Image area 6 and image area 7 have an intersection zone 8 where both such signals from organ 3 and 4 are superposed.

In this intersection zone 8, it cannot be known which part of the signal comes from organ 3 and which part of the signal comes from organ 4.

Figure 1B:
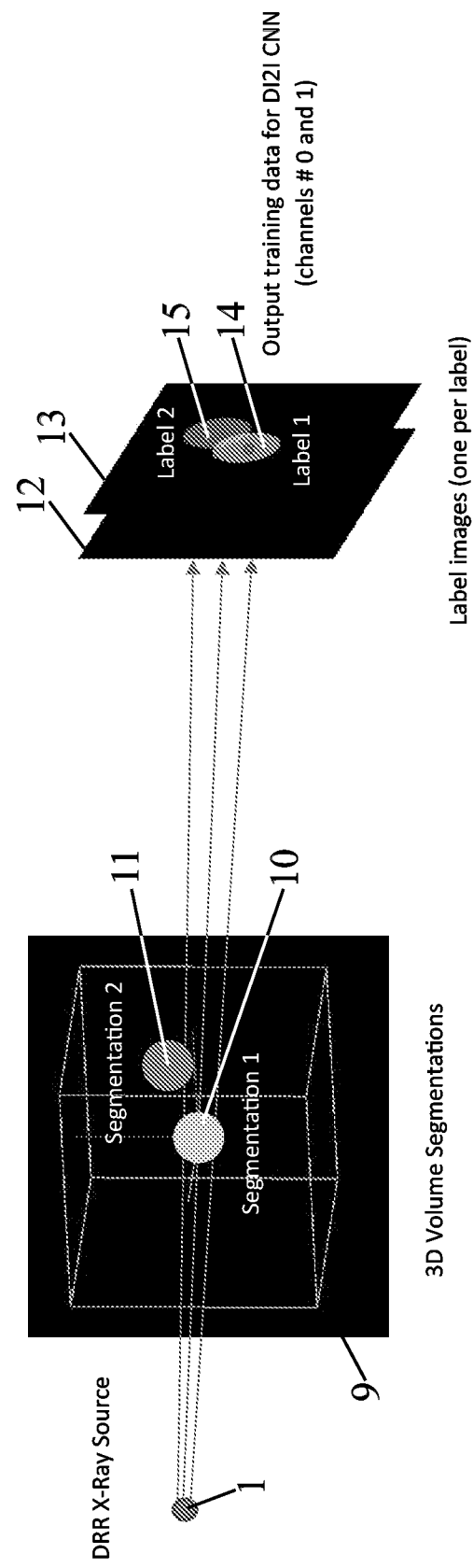
FIG. 1B shows a second step of performing segmentation to separate anatomical structures from each other, during training phase according to prior art.

FIG. 1B shows a second step of performing segmentation to separate anatomical structures from each other, during training phase according to prior art.

From a DRR x-ray source 1, a segmentation of first organ 3 and second organ 4 is performed so as to separate from each other first organ 3 and second organ 4.

Segmentation of first organ 3 and second organ 4 gives respectively a first label image 12 and a second label image 13, on which there are respectively a first trace 14 of first organ 3 and a second trace 15 of second organ 4.

However, even when these segmentation first trace 14 and second trace 15 are applied afterwards on the global DRR 5, they do not result into a first DRR of the first organ 3 and a second DRR of the second organ 4, because the mixture of signal within the intersection zone 8 can no more be separated between their respective original contributions, which means between the respective contributions coming from first organ 3 on one side and coming from second organ 4 on the other side.

Hence, applying segmentation to a global DRR does not result into several different local DRR of different organs, because in all intersection zones 8, mixed signal coming from several different organs can no more be separated into their original contributions. There has been a loss of useful signal that cannot be recovered or at least that would become very hard to recover.

Figure 1C:
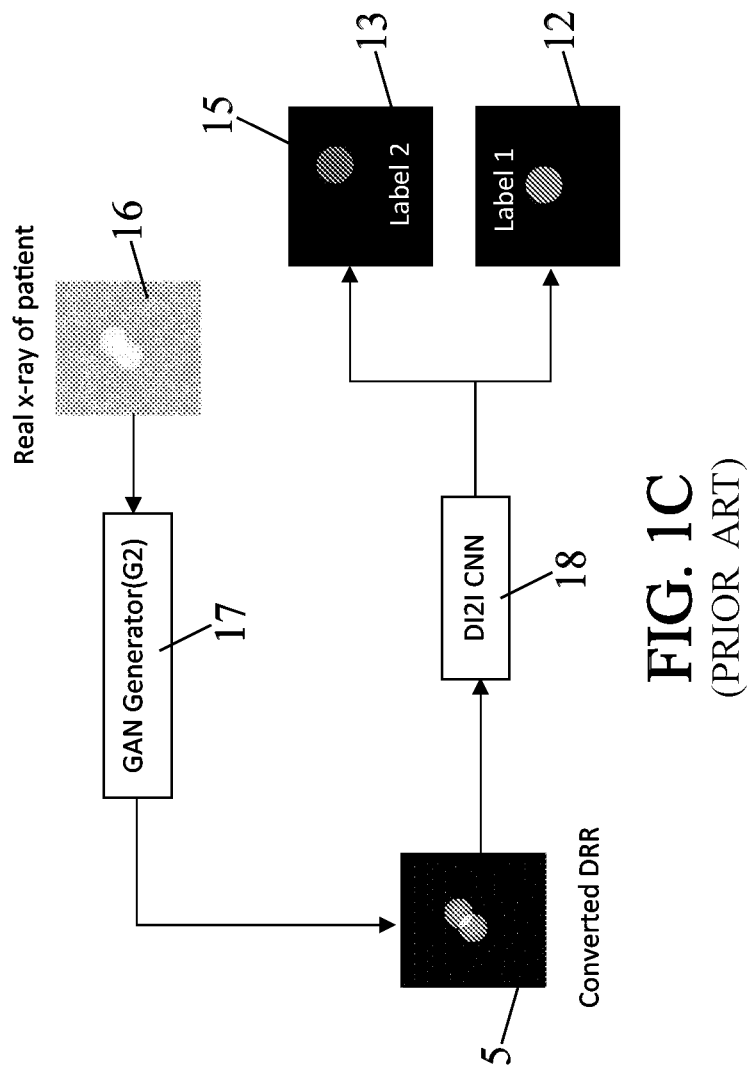
FIG. 1C shows a method to convert an x-ray image into segmented images of different anatomical structures, according to prior art.

FIG. 1C shows a method to convert an x-ray image into segmented images of different anatomical structures, according to prior art.

An x-ray image 16 is converted by a GAN 17 into a converted global DRR 5 which, in turn, is segmented by DI2I CNN 18 into:

a first binary mask 12 of this converted global DRR 5, corresponding to the segmentation 14 of the first organ 3, a second binary mask 13 of this converted global DRR 5, corresponding to the segmentation 15 of second organ 4.

Obtaining separately the regional DRR images corresponding to the first organ 3 or the second organ 4 from the first binary mask 12 or the second binary mask 13 should be with loss of useful signal in the intersection zones 8.

FIG. 2A shows a first step of making a regional DRR of a first anatomical structure for training of a GAN, during the training phase according to an embodiment of the invention.

From a DRR x-ray source 1, ray casting is performed through a 3D volume 20 containing only a first organ 21 already separated from a second organ 22 which is different from first organ 21.

First organ 21 has a planar projection on a local DRR, respectively DRR image 23 dedicated to first organ 21 and representing a DRR image 24 corresponding exactly to planar projection of first organ 21 without loss of useful signal.

In DRR image 24, all signal comes from first organ 21, and no signal comes from second organ 22. No useful signal about the planar projection of first organ 21 has been lost.

FIG. 2B shows a second step of making another regional DRR of a second anatomical structure for training of a GAN, during the training phase according to an embodiment of the invention.

From a DRR x-ray source 1, ray casting is performed through a 3D volume 20 containing only a second organ 22 already separated from a first organ 21 which is different from second organ 22.

Second organ 22 has a planar projection on a local DRR, respectively DRR image 25 dedicated to second organ 22 and representing a DRR image 26 corresponding exactly to planar projection of second organ 22 without loss of useful signal.

In DRR image 26, all signal comes from second organ 22, and no signal comes from first organ 21. No useful signal about the planar projection of second organ 22 has been lost.

Figure 2C:
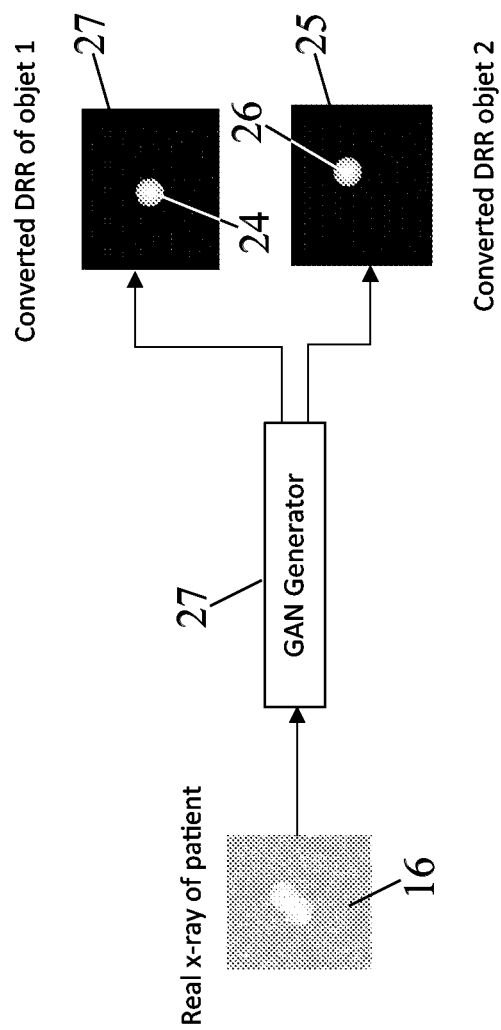
FIG. 2C shows a method to convert an x-ray image into several different regional DRR representing respectively several different anatomical structures, according to an embodiment of the invention.

FIG. 2C shows a method to convert an x-ray image into several different regional DRR representing respectively several different anatomical structures, according to an embodiment of the invention.

An x-ray image 16 is converted by a GAN 27 into two separate converted regional DRR 23 and 25 which correspond respectively to:
- a first local DRR, corresponding exactly to planar projection of first organ 21, without loss of useful signal related to first organ 21, to the contrary of image 12 on FIG. 1C,
- a second local DRR, corresponding exactly to planar projection of second organ 22, without loss of useful signal related to second organ 22, to the contrary of image 13 on FIG. 1C.

Intensity-based elastic registration of 3D models to 2D planar images is one of the methods used as a key step in the 3D reconstruction process. This kind of registration is similar to multimodal registration and relies on maximizing the similarity between the actual x-rays images and digitally reconstructed radiographs (DRR) generated from the 3D models. Given that 3D models usually do not contain all the information, for example density is not always included, the two images, e.g. actual X-ray and DRR are significantly different from each other, making the optimization process very complex and often unreliable. The standard solution is to make the DRR generation process as close as possible to the image formation process by adding additional information and simulating complex physical phenomena. In the algorithm proposed by embodiments of the invention, the contrary approach is used by transforming the actual X-ray image to a DRR-like image in order to ease the images matching.

A step of image conversion, that turns the x-ray images into DRR-like images allowing to remove background and noise from original images and to bring it to the DRR domain, is proposed. It turns the matching between both images simpler and more efficient since images have similar characteristics and it improves the optimization process even using standard similarity metric.

This is done by using a pix-to-pix deep neural networks training, based on U-Net convolutional neural network (CNN), that allows to convert an image from one domain to another domain. Using the x-ray image transformation to DRR-like image facilitates the mesh 3D/2D registration. Moreover, the proposed CNN-based converter can separate adjacent bone structures by outputting one converted image per bone structure to better handle the articulated bone structures.

The embodiments of the invention are applied to the 3D challenging reconstruction of the spine structure from bi-planar x-rays imaging modality. Spine structure is a periodic multi-structure that can present anatomical deformations. The pix-to-pix network converts the actual x-ray images into virtual x-ray images that allow to:
- first, improve image to image correspondence and registration performance,
- and second, to identify and isolate a specific structure from similar neighbors to avoid mismatching.

Figure 3A:
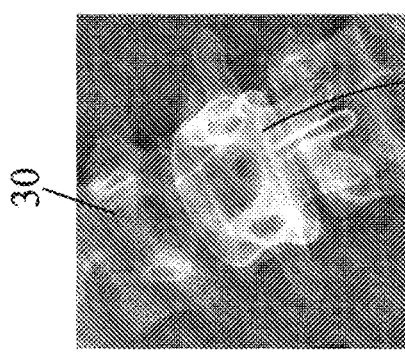
FIG. 3A shows an example of 3D/2D registration according to some prior art.
Figure 3B:
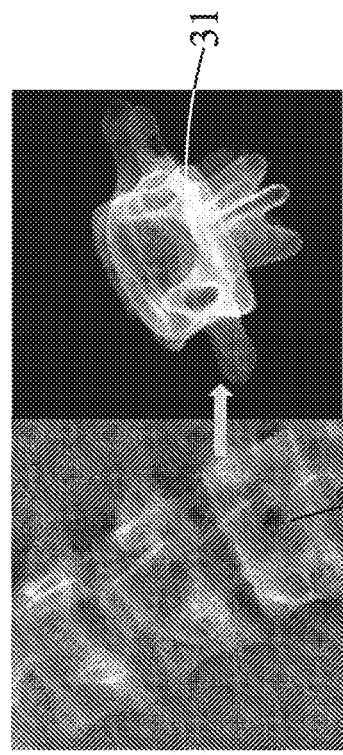
FIG. 3B shows an example of 3D/2D registration according to embodiments of the invention.

The principle of this 3D/2D registration is presented by a comparison made between prior art represented on FIG. 3A and embodiments of the invention represented on FIG. 3B. FIG. 3A shows an example of 3D/2D registration according to some prior art. FIG. 3B shows an example of 3D/2D registration according to embodiments of the invention.

On FIG. 3A, is represented a classical way, according to some prior art, for 3D/2D registration using similarity between DRR generated from mesh and x-rays image. Unfortunately, it is not easy to distinguish the vertebra 31 of interest from the rest of the spine 30.

On FIG. 3B, the registration process, proposed by embodiments of this invention, uses prior image-to-image translation that converts the target image in order to ease the image correspondence in the registration similarity function and to avoid mismatching on adjacent structures. Here, the vertebra 31 of interest has been separated from the rest of the spine 30.

Figure 4B:
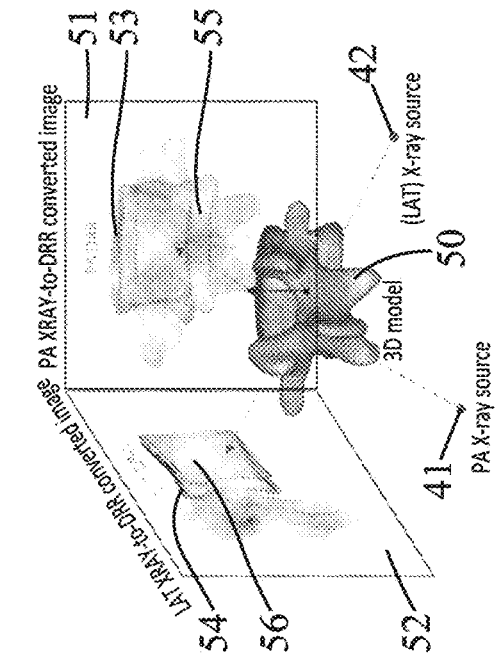
FIG. 4B shows an example of 3D/2D registration according to embodiments of the invention.
Figure 4A:
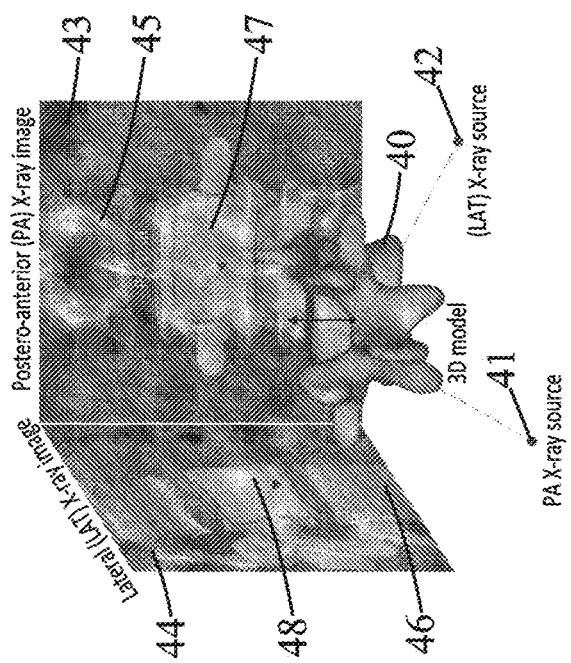
FIG. 4A shows an example of 3D/2D registration according to some prior art.

The application of this principle of this 3D/2D registration is also presented by a comparison made between prior art represented on FIG. 4A and embodiments of the invention represented on FIG. 4B, for frontal and lateral planar projections of a 3D model. FIG. 4A shows an example of 3D/2D registration according to some prior art. FIG. 4B shows an example of 3D/2D registration according to embodiments of the invention.

On FIG. 4A, one classical way for 3D/2D registration of a 3D model using similarity between DRR projections generated from the 3D mesh and bi-planar x-ray images is represented, according to some prior art. A 3D model 40 is located between a first frontal x-ray source 41 and a planar x-ray image 43 on which is imaged a frontal projection of 3D model 40. Unfortunately, frontal image of vertebra 47 of interest is mixed up with the rest of the spine 45. The 3D model 40 is also located between a second lateral x-ray source 42 and a planar x-ray image 44 on which a lateral projection of 3D model 40 is imaged. Unfortunately, lateral image of vertebra 48 of interest is mixed up with the rest of the spine 46.

The intensity-based methods, i.e. iconic registration, aim to find the best model's parameters that maximize the similarity between the x-ray images and the digitally reconstructed radiographs (DRR) generated from the 3D model. They do not require extraction from images and are more robust and flexible. However, they involve using complex models and algorithms to generate a DRR as realistic as possible, i.e. as close as possible to actual x-ray images, to have efficient similarity measures. As they are the criteria optimized in the registration process, they should reflect the actual matching degree of structures on both varying and target images and should be robust to perturbations in order to avoid trapping in local minima. A main perturbation is that both images to match differ in modalities, even if the DRR generation appears to be rather realistic. A sophisticated similarity metric should be used to compare an image of a domain A (for instance, real x-ray image) to an image of a domain B (for instance, DRR image). These domain differences limit the performance of model registration on real clinical data. Registration in planar x-rays has another additional specificity which is the presence of adjacent structures and overlaps in the environment that leads to mismatching, especially if the initial 3D model isn't close enough as can be seen on FIG. 4A.

On FIG. 4B, a method proposed according to embodiments of the invention is represented. The proposed prior step of XRAY-to-DRR translation converts the x-ray target image into a DRR with a single structure in order to improve the similarity level and prevents mismatching on adjacent structures in the registration process. A 3D model 50 is located between a first frontal x-ray source 41 and a planar DRR converted image 51 on which a frontal projection of 3D model 40 is imaged. Here, it is much easier to perform superposition of the frontal projection 55 of 3D model 40 for the vertebra of interest, with the very same vertebra of interest 53 remaining alone and separated from the original x-ray image converted into DRR (the rest of spine, i.e. the other neighbor vertebrae, has been taken out). A 3D model 50 is also located between a second lateral x-ray source 42 and a planar DRR converted image 52 on which a lateral projection of 3D model 40 is imaged. Here also, it is much easier to perform superposition of the lateral projection 56 of 3D model 40 for the vertebra of interest, with the very same vertebra of interest 54 remaining alone and separated from the original x-ray image converted into DRR (the rest of spine, i.e. the other neighbor vertebrae, has been taken out).

The method proposed by embodiments of the invention, visible on FIG. 4B, does the opposite approach thereby changing of paradigm. Indeed, instead of improving either similarity metric or DRR x-ray simulation, it explores a way to convert the x-ray image into a DRR-like image using a cross modality image to image translation model based on pix-to-pix generative adversarial network (GAN). The XRAY-to-DRR translation simplifies the whole process and allows to use both simpler DRR generation and similarity metrics as can be seen on FIG. 4B.

Experimentations are applied to the 3D challenging reconstruction of the multi-object and periodic structure of the spine bones from bi-planar x-rays imaging modality. The step of XRAY-to-DRR translation is added prior to the elastic 3D/2D registration to convert the actual x-ray image into a DRR-like image with separated anatomical structures. Using this translation step facilitates the mesh 3D/2D registration, because the image matching is more efficient, even when using standard similarity metrics, since both images have similar characteristics, and similarity measurements are only performed on isolated anatomical structures of interest.

Figure 5:
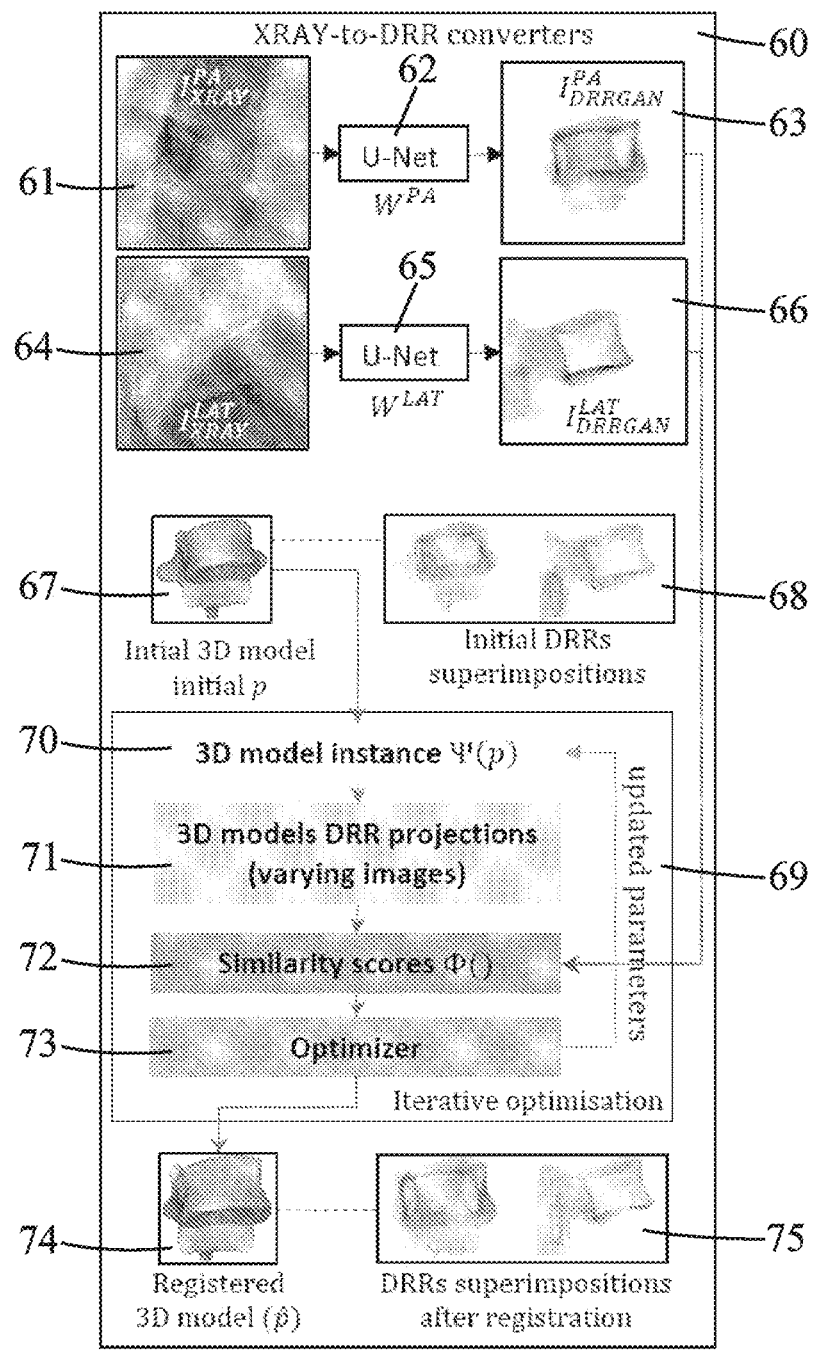
FIG. 5 shows a global flowchart of an example of performing a 3D/2D registration method according to embodiments of the invention.

FIG. 5 shows a global flowchart of an example of performing a 3D/2D registration method according to embodiments of the invention. This flowchart 60 converts x-ray images into DRR images. A frontal x-ray image 61 is converted into a frontal DRR image 63 by a GAN 62 with a frontal set of weights. A lateral x-ray image 64 is converted into a lateral DRR image 66 by a GAN 65 with a lateral set of weights. Starting from both an initial 3D model 67 and initial DRRs superimpositions 68, both a modified registered 3D model 74 and modified DRRs superimpositions 75 are obtained by an iterative optimization 69. This iterative optimization comprises a cycle including following successive steps: first, step 70 of 3D model instance, then step 71 of 3D models DRR projections, then 72 step of similarity scores, and then step 73 of optimization, and again back to step 70 of 3D model instance with updated parameters.

In order to efficiently address the DRR image matching on a radiograph having overlapping objects, and to improve the robustness, the accuracy of the registration and to reduce the computational complexity, it is proposed to introduce a prior step of image to image translation using pre-trained pix-to-pix GAN networks that convert the x-ray image to a DRR image as can be seen on FIG. 5. The resulting XRAY-to-DRR conversion networks allow both to measure efficient cross-image similarity, and to use simple DRR generation algorithm, because both images to match, varying DRR generated from the 3D mesh (DRR3DM) and target DRR, belong to the same domain. The proposed step of XRAY-to-DRR translation converts the x-ray images into DRR3DM-like images with uniform background and noise, soft tissues and adjacent structures all removed as could be seen on FIG. 4B. Indeed, the image converters are trained to separate adjacent bone structures by outputting one converted DRR image per bone structure. The issue of registering a mono-structure 3D model in a scene composed of multi-objects, for instance articulated bone structures, is thus addressed.

Figure 6:
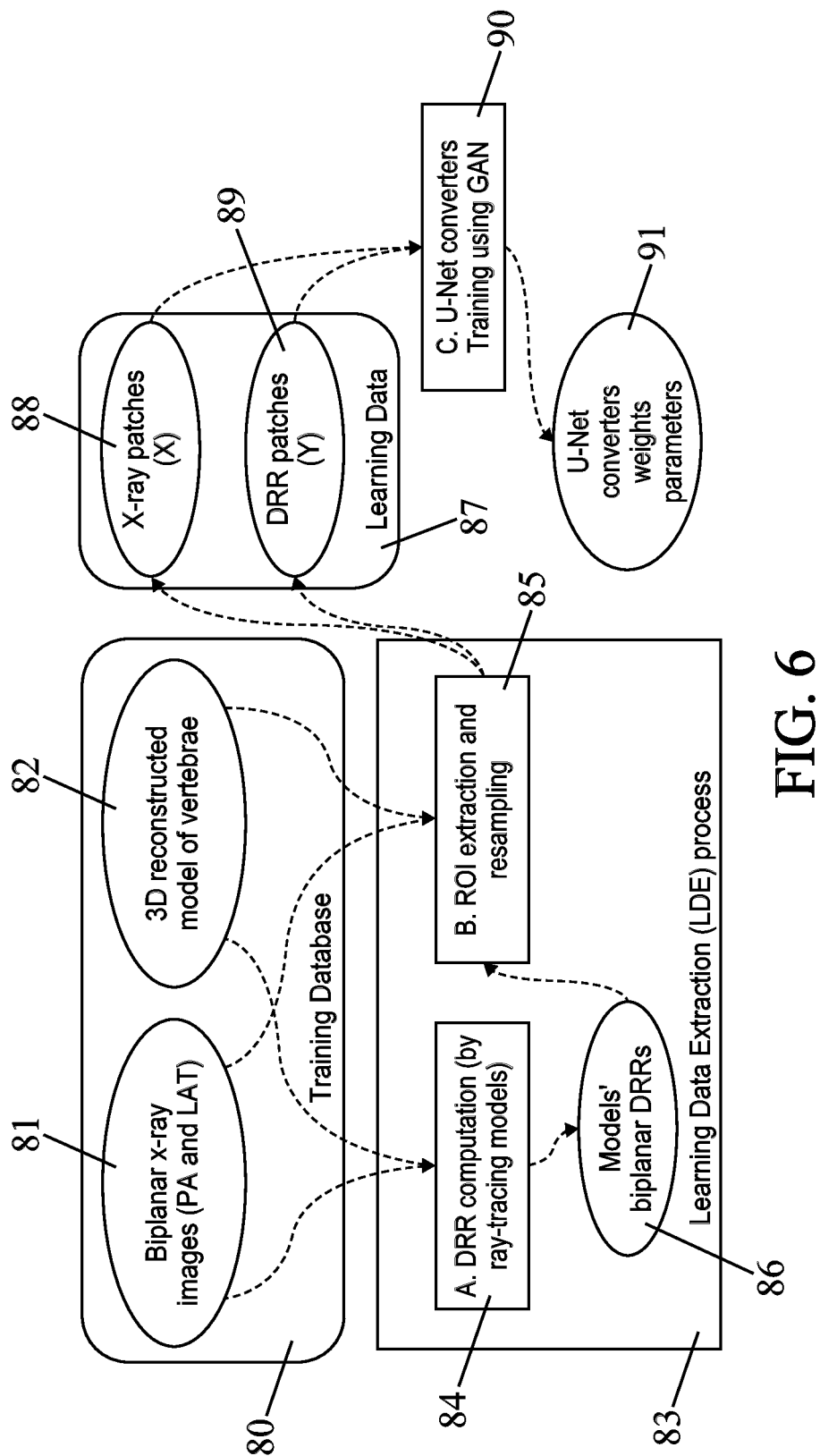
FIG. 6 shows a more detailed flowchart of an example of a training phase before performing a 3D/2D registration method according to embodiments of the invention.

FIG. 6 shows a more detailed flowchart of an example of a training phase before performing a 3D/2D registration method according to embodiments of the invention. The method proposed by embodiments of the invention requires a prior training phase providing U-Net converters to transform an X-ray patch to a DRR-like patch in order to facilitate the 3D/2D registration.

A training database 80 includes a set 81 of bi-planar x-ray images, both frontal (also called posterior-anterior) and lateral, and a 3D reconstructed model 82 of vertebrae. A learning data extraction process 83 performs an operation 84 of DRR computation, by ray casting models, for example using a process similar to the one described in patent application WO 2009/056970, and an operation 85 of Region of Interest (ROI) extraction and resampling. The learning phase 83 is required to train the U-Net XRAYS-to-DRR converters. Both the operation 84 of DRR computation and the operation 85 of ROI extraction and resampling use, as inputs, both the set 81 of bi-planar x-ray images and the 3D reconstructed model 82 of vertebrae. The operation 84 of DRR computation produces, as output, a set 86 of model's bi-planar DRRs whereas the operation 85 of ROI extraction and resampling uses, as input, this set 86 of model's bi-planar DRRs.

Learning data 87 include a set 88 of x-ray patches and a set 89 of DRR patches, these patches being representative of the different anatomical structures. This set 88 of x-ray patches and this set 89 of DRR patches are produced by the operation 85 of ROI extraction and resampling. The data 87, required for this training, is a pair of sets 88 and 89 of patches which are all square images of size 256×256 pixels.

Both this set 88 of x-ray patches and this set 89 of DRR patches are used as inputs during an operation 90 of U-Net converters training using GAN in order to produce a set 91 of U-Net converters weights parameters.

The patches 88, noted X, are extracted from the x-ray bi-planar images 81. The patches 89, noted Y, are extracted from bi-planar DRRs 86 which were generated from the reconstructed 3D models.

The training aims to fit these data with the U-Net model: Y=predict(X, W)+ε, where ε are the residuals of the prediction and W are the resulting trained weights which are neural networks parameters.

X and Y are 4D tensors of sizes defined as follow:
X: [N, 256, 256, M]: with N the total number of patches, M the numbers of input channels among for instance:
M=1: patches belong to frontal (FRT) or lateral (LAT) views
M=2: to train a joint model FRT+LAT
Y: [N, 256, 256, K×M]: with N the total number of patches, K the numbers of anatomies (DRR images) in output channels among for instance:
K=1: only one anatomical structure,
K=3: upper/middle and bottom adjacent vertebrae, what is the model proposed for 3D/2D registration of vertebra in the embodiments,
K=4: model to have the left and right femur and tibia in LAT view for instance.

The extraction of training data, i.e. the patches 88 and 89, is done as follow:
M patients are used for the training. Each patient has the following data:
The FRT and LAT calibrated radiograph DICOM images,
The 3D modeling of the spine.
The M patients are separated in two different sets: the training set, used for neural networks weights modifications, and a test set used to survey the training convergence, training curves, and select the best model, with optimal generalization inferences/predictions.
For each patient, a set of P patches are extracted, so that N=M×P:
The expert's 3D models are used to generate the both PA (posterior anterior) and LAT DRR images,
A set of P patches of size 256×256 are extracted from both DRR (Y) and actual images (X),
The locations of patches are randomly shifted from the 3D vertebra body center in the range [25, 25, 25] (in respect to a uniform law) in order to shift the structure on images to artificially increase the dataset size. Another data augmentation is done by using:
Global rotation around 2D VBC: [−20 20 degrees]
Global scaling [0.9, 1.1]
Local deformation of images with a variation of [−5, +5 degrees] around the endplate centers.

Figure 7:
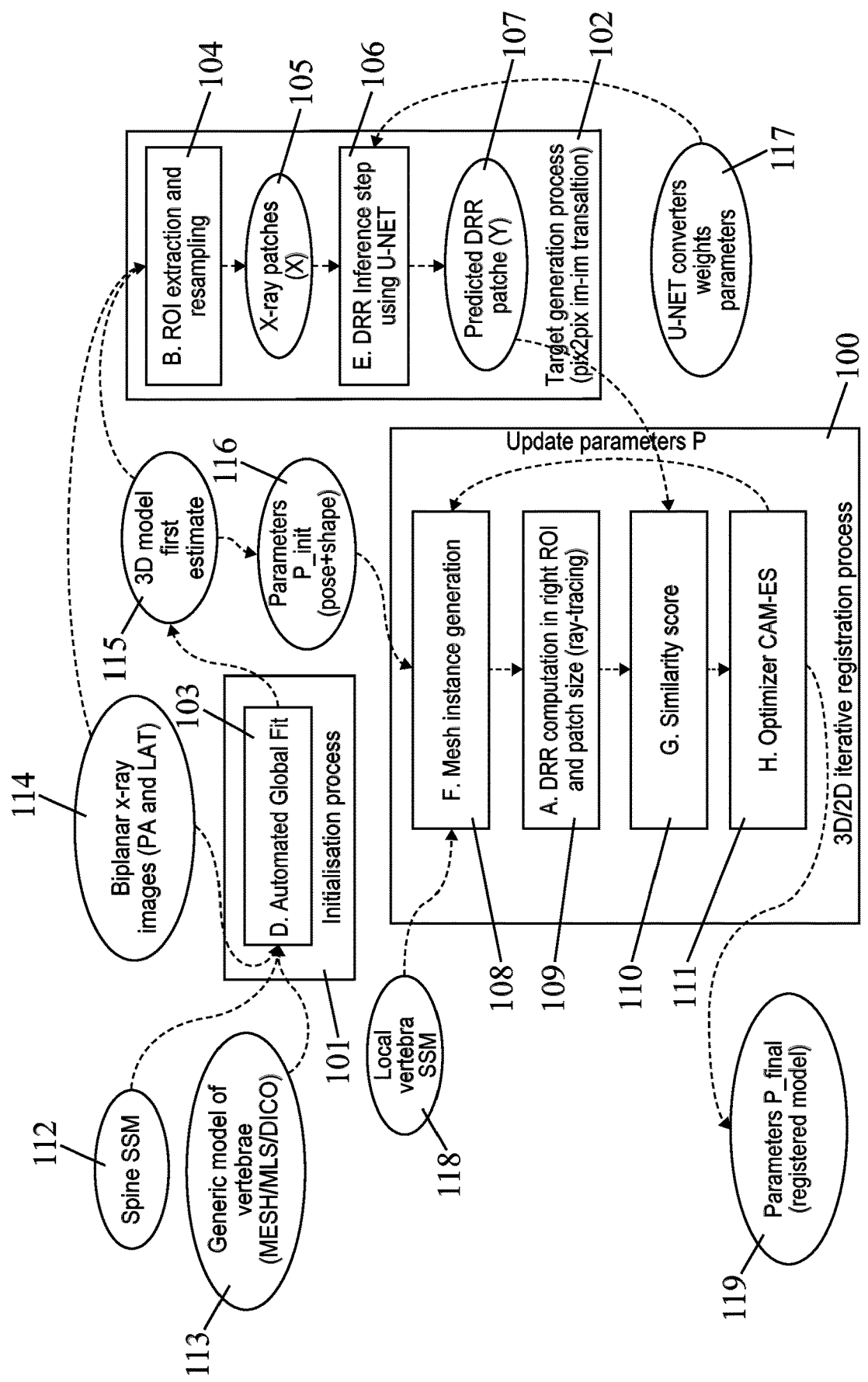
FIG. 7 shows a more detailed flowchart of an example of performing a 3D/2D registration method according to embodiments of the invention.

FIG. 7 shows a more detailed flowchart than flowchart of FIG. 5 showing an example of performing a 3D/2D registration method according to embodiments of the invention. The represented iterative registration process aims to find the model parameters that maximize the similarity between the converted target DRR images and the moving DRR image computed from the 3D model (DRR3DM) in both posterior-anterior (PA) (also called frontal) and lateral (LAT) views. This more detailed flowchart includes the process that converts x-ray images into DRR images 102.

A spine statistical shape model (SSM) 112 and vertebra deformable models 113 (each composed of a generic model, a dictionary of labelled 3D points, and a set of parametric deformation handles to control a moving least square deformation), are used as inputs by an initialization process 101 performing an operation 103 of automated global fit so as to give a 3D model first estimate 115. This 3D model's first estimate 115 is inserted into a set of initial parameters 116 to be used by the iterative optimization loop 100.

This 3D model's first estimate 115 is also used with a set 114 of bi-planar x-ray images, both frontal and lateral, as input to a target generation process 102. This target generation process 102 performs a pixel to pixel (pix-to-pix) image to image translation. This target generation process 102 includes following successive steps which are: first, a step 104 of ROI extraction and resampling, starting from this 3D model first estimate 115 and this set 114 of bi-planar x-ray images as inputs, to produce a set 105 of x-ray patches, noted X, and therefrom, a step 106 of DRR inference using U-Net converters weights parameters 91, 117 thereby producing a set 107 of predicted DRR patches, noted Y.

The iterative optimization loop 100 of this 3D/2D registration process comprises a cycle of following successive steps:
A first step 108 of mesh instance generation, using as inputs both set of parameters initial 116 and a local vertebra statistical shape model (SSM),
A second step 109 of DRR computation in right vertebra ROI and patch size, by ray casting,
A third step 110 of similarity scoring, also using the set 107 of predicted DRR patches noted Y,
A fourth step of optimizing by a covariance matrix adaptation evolution strategy (CMA-ES), and then back to first step 108 with updated parameters, producing at the end of iterative cycling, as final output the optimized parameters 119 corresponding to the registered model.

This new way proposed by embodiments of the invention to solve elastic, or even rigid, 3D/2D registration of a 3D model on planar radiographs includes the training of XRAY-to-DRR converter networks and a fast DRR generation algorithm computed from a bone dual-layer meshed model not requiring accurate tissues density. Maximizing the similarity, in step 110, between the varying DRR, in step 109, generated from the 3D mesh (DRR3DM), in step 108, and the converted DRR image used as target (DRRGAN), in step 107, allow to find the best model's parameters, in step 119, easier because, first the image-image correspondence lies in one unique domain and is facilitated, and second, mismatching on the adjacent structures is avoided thank to structure separation in XRAY-to-DRR conversion. The iterative registration process 100 aims to maximize the similarity between the DRR3DM and the DRRGAN simultaneously in all views.

Formally, this can be seen as how to maximize the following cost function (Eq. 1) to find the optimal parameters $\hat{p}$ 119 that control the pose and shape of the 3D model:

$$\hat{p} = \text{argmax}_p [\Sigma_{v=1}^{L} \Phi(I_{DRR3DM}^v(p), I_{DRRGAN}^v)] \quad \text{(Eq. 1)}$$

where $\Phi(I_{DRR3DM}^v, I_{DRRGAN}^v)$ (Eq. 2) is any similarity function computed between the varying image $I_{DRR3DM}^v$ and the target image $I_{DRRGAN}^v$ for the view v (over a total number of L views), both images are regions of interest (ROI) of original image around the target structure to register. The varying image $I_{DRR3DM}^v(p)$ depends of the model's parameters vector p and is computed as the DRR projection function $P^v(\ )$ on view v (Eq. 3):

$$I_{DRR3DM}^v(p) = P^v(\Psi(p)) \quad \text{(Eq. 3)}$$

where Ψ(p) (Eq. 4) generates the 3D model instance controlled by parameters vector p. The target image $I_{DRRGAN}^v$ is defined as the converted image using a U-Net prediction (Eq. 5):

$$I_{DRRGAN}^v = f(I_{XRAY}^v, W^v) \quad \text{(Eq. 5)}$$

where $I_{XRAY}^v$ is a ROI patch of the original x-rays of view υ, and f(I, W) represent a feed forward inference of a GAN-based trained U-Net having the CNN parameters W and the input image 1. In this context, a bi-planar radiograph system is used, with L=2 views (PA and LAT). The cost function (Eq. 1) can be maximized in an iterative process using an optimizer as presented in the proposed method flowchart represented on FIG. 7.

The following paragraphs present the method of DRR projection, according to embodiments of the invention, from a two-layer meshed surface and the CNN architecture and training of the XRAY-to-DRR converters. While the method explanations are oriented toward the spine structure, it can be applied to any (multi-) structure 3D model 3D/2D registration on calibrated planar view(s).

DRR projection forming two-layer mesh is now described. It is implemented preferably by using a process similar to the one described in patent application WO 2009/056970. This is a process of DRR generation from a 3D surface mesh S on one view u related to the projection function $P^v(S)$ (Eq. 3). The virtual x-ray images (DRR) are computed using a ray-casting intersecting a 3D surface model composed of two layers delimiting two mediums which are the cortical and the spongy bone mediums. The medium separating surface is used to consider two different factors of attenuations corresponding to both material characteristics. The cortical structure counts for the highest x-ray's energy absorption and appears brighter in radiographs. The 3D model is represented by a meshed surface S={V, F} defined by the set of 3D vertices $V \subseteq \mathbb{R}^3$ with (x, y, z) coordinates, and a set of faces $F \subseteq \mathbb{Z}^3$ with vertex indexes defining the triangle faces.

Figure 8A:
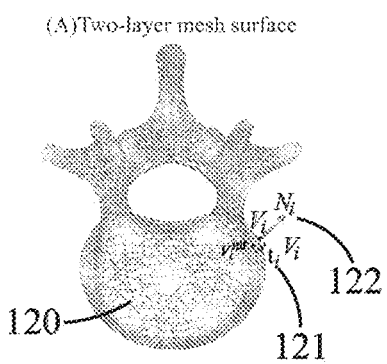
FIG. 8A shows an example of the principle of internal layer creation from the external layer using prior cortical thicknesses and normal vectors, according to embodiments of the invention.

FIG. 8A shows an example of the principle of internal layer creation from the external layer using prior cortical thicknesses and normal vectors, according to embodiments of the invention. On the meshed surface 120, can be seen the addition of both the prior cortical thicknesses ti 121 and of the normal vector Ni 122.

The two-layer mesh surface is created by adding an internal layer to the mesh 120. For each surface vertex $V_i$, the internal vertex is calculated using Eq. 6:

$$V_i^{int} = V_i - t_i \frac{\vec{N_i}}{\|\vec{N_i}\|} \quad \text{(Eq. 6)}$$

where $\vec{N_i}$ is the surface normal at the vertex $V_i$ and $t_i$ is the cortical thickness at the vertex $V_i$, as can be seen on FIG. 8A. Each vertex's normal is computed as the normalized vector of summed face normals belonging to the vertex ring. The cortical thickness values of specific anatomical landmarks can be found in literature studies, for instance for vertebral endplates and pedicles.

Figure 8B:
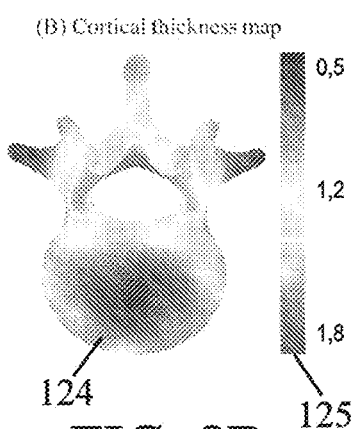
FIG. 8B shows an example of the interpolated thickness map for the whole mesh of a L1 vertebra, according to embodiments of the invention.

FIG. 8B shows an example of the interpolated thickness map for the whole mesh of a L1 vertebra, according to embodiments of the invention. The different regions of the map 124, represented usually by different colored zones of the map 124, correspond to different values ranging from 0.5 to 1.8 (top down) with a middle value at 1.2 on the scale 125 represented on the right side of the map 124.

These values of cortical thickness values of specific anatomical landmarks are interpolated on the whole mesh vertices using a Thin Plate Spline 3D interpolation technique allowing for computing a cortical thickness map 124, as can be seen on FIG. 8B.

Figure 9:
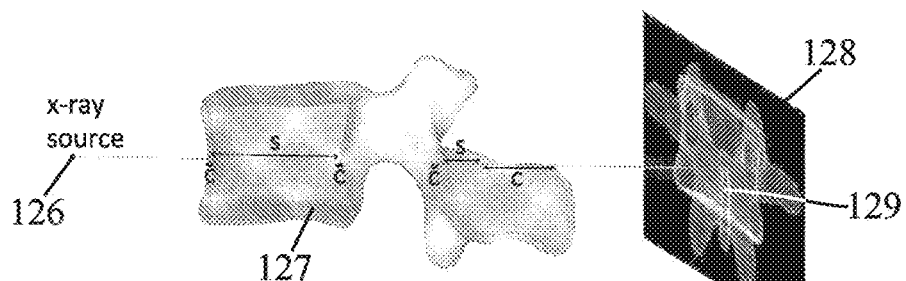
FIG. 9 shows an example of the principle of ray-casting through the two-layer mesh.

FIG. 9 shows the principle of ray-casting through the two-layer mesh. The ray joining the x-ray source 126 and a pixel 129 on DRR image 128 traverses alternatively the cortical and spongy mediums of the vertebra 127. The ray-casting reproduces the principle of the x-ray image formation and it computes the accumulation of traversed thickness through the two bone mediums of the vertebra 127.

Figure 10:
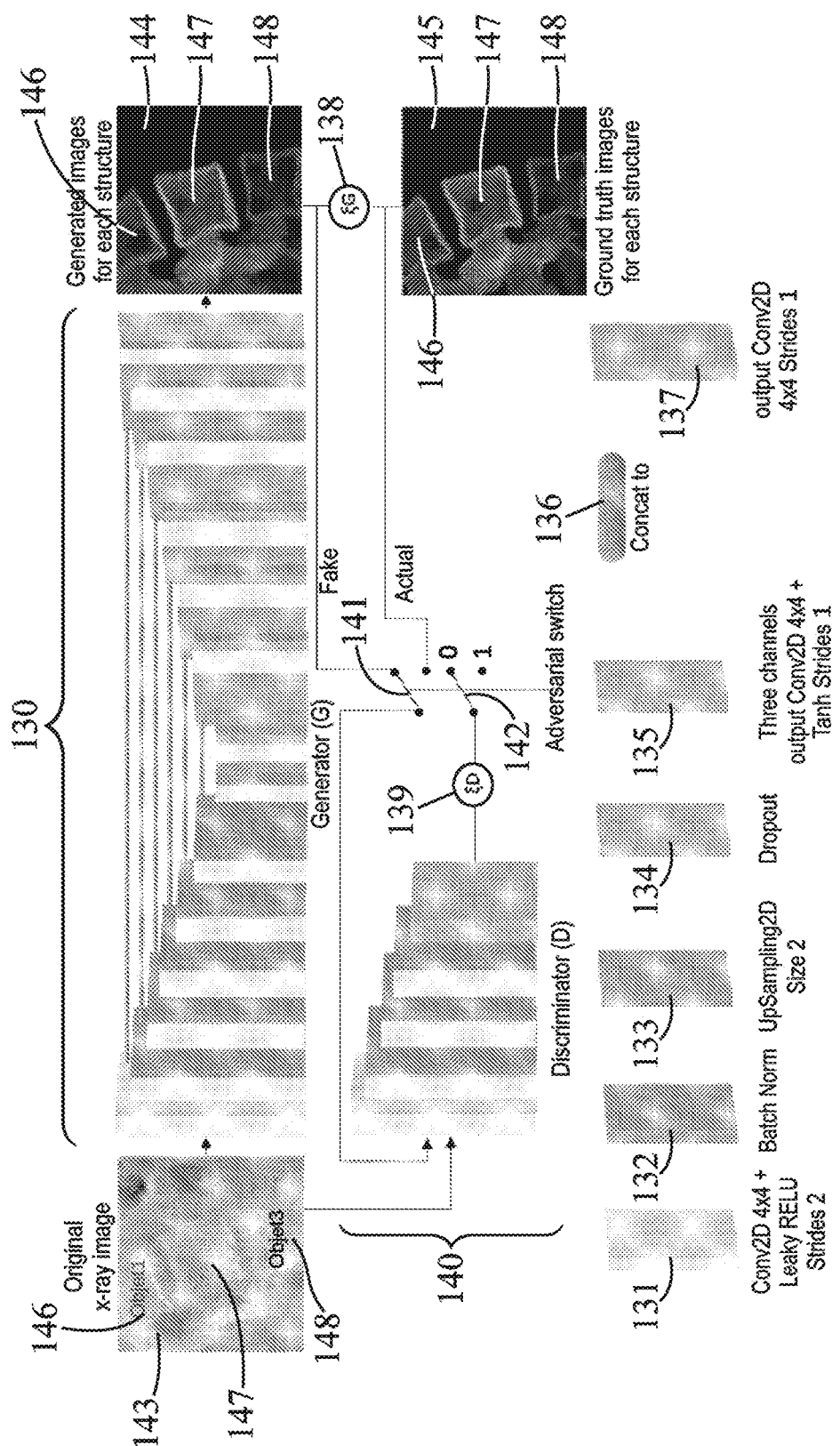
FIG. 10 shows an example of XRAY-to-DRR GAN network architecture and training, according to embodiments of the invention.

FIG. 10 shows an example of XRAY-to-DRR GAN network architecture and training, according to embodiments of the invention.

The U-Net generator 130 is trained to convert the input XRAY patch 143 into a DRR image 144 having three channels 146, 147 and 148, i.e. one channel per vertebra DRR 146, 147 and 148, represented by a Red Green Blue (RGB) image.

The generator 130 comprises several convolutional layers, each layer including one or more slices, each slice representing an operation. Several types of slice or operation are available:

Slice or operation 131: Convolutional 2D layer of size 4×4 with a stride of 2 and with Leaky Rectified Linear Unit activation function Slice or operation 132: Batch normalization Slice or operation 133: Up Sampling 2D layer of size 2

Slice or operation 134: Dropout layer

Slice or operation 135: Three channels output Convolutional 2D layer of size 4×4 with a stride of 1 and with a hyperbolic tangent activation function Slice or operation 137: Output convolutional 2D layer of size 4×4 with a stride of 1

From left to right, from the XRAY patch 143 to the DRR image 144, the composition of the successive convolutional layers within the generator 130, whose input is the XRAY patch 143 and whose output is the DRR image 144, is:

Layer 1: slice 131
Layer 2: slice 131 and then slice 132
Layer 3: slice 131 and then slice 132
Layer 4: slice 131 and then slice 132
Layer 5: slice 131 and then slice 132
Layer 6: slice 131 and then slice 132
Layer 7: slice 131 and then slice 132 and then slice 133
Layer 8: slice 131 and then slice 134 and then slice 132
Layer 9: slice 133 and then slice 131 and then slice 134 and then slice 132
Layer 10: slice 133 and then slice 131 and then slice 134 and then slice 132
Layer 11: slice 133 and then slice 131 and then slice 134 and then slice 132
Layer 12: slice 133 and then slice 131 and then slice 132
Layer 13: slice 133 and then slice 131 and then slice 132
Layer 14: slice 133 and then slice 131 and then slice 132 and then slice 135

Layers can be concatenated together what is shown by a horizontal line 136:

Layers 1 and 14 are concatenated together
Layers 2 and 13 are concatenated together
Layers 3 and 12 are concatenated together
Layers 4 and 11 are concatenated together
Layers 5 and 10 are concatenated together
Layers 6 and 9 are concatenated together
Layers 7 and 8 are concatenated together A discriminator 140 comprises 5 successive layers, from left to right, from input to output:

Layer 1: slice 131
Layer 2: slice 131 and then slice 132
Layer 3: slice 131 and then slice 132
Layer 4: slice 131 and then slice 132
Layer 5: slice 137

At the output of the discriminator 140, there is a loss function 139. After this loss function 139, there is part 142 of adversarial switch with two switchable positions, 0 and 1.

Between the generated DRR image 144 (indeed, 3 images 146, 147 and 148, one per vertebra) and the corresponding ground truth DRR image 145 (indeed, 3 images 146, 147 and 148, one per vertebra), there is a loss function 138. From the generated DRR image 144, there is a feedback toward a switchable "fake" position of part 141 of adversarial switch. From the corresponding ground truth DRR image 145, there is a feedback toward another switchable "actual" position of this part 141 of adversarial switch. Then, the extremity opposed to fake and actual positions of this part 141 of adversarial switch comes back to be one of the input of the discriminator 140, the other input of the discriminator 140 being the XRAY patch 143.

XRAY-to-DRR converter is now described. The XRAY-to-DRR image converters (Eq. 5) are U-Net networks trained using a generative adversarial network (GAN). The U-Net training creates a dense pixel-wise mapping between paired input and output images, allowing for the generation of realistic DRR images with consistent overall look. It involves building deep abstract representations to solve this problem. The generative adversarial network (GAN) is composed of a U-Net generator (G) 130 and a CNN discriminator (D) 140. Therefore, two loss functions, loss function 138, for the generator 130, and loss function 139, for the discriminator 140, are defined. First, the residuals between the converted 144 and actual 145 DRR images from the training database are computed by the following mean absolute loss function 138 error:

$$\xi G = \frac{\sum_{i=1}^{n}\sum_{j\in\mathbb{Z}^{whc}}|DRR_i^j - f(XRAY_i, W)^j|}{nwhc} \quad \text{(Eq. 7)}$$

where (n, w, h, c) are the dimensions of the 4D tensor of training data output (DRR images) having n 3D images of size width (w)×height (h)×channels (c), $DRR_i^j$ is the j nth pixel of the i nth sample image, $f(XRAY_i, W)$ is the U-Net prediction of the i nth input XRAY, having the current CNN parameters W. The input data are also a 4D tensor of size (n, w, h, k). The sizes k and c are respectively the number of channels in input (XRAY) and output (DRR) images. The discriminator (D) 140 aims to classify if presented XRAY/DRR couple of images on its input is a DRR generated image (fake class) or an actual DRR image (real class). Therefore, the loss function $\xi D$ 139 is defined by the binary cross-entropy loss.

The training data are split in small mini-batches (for instance of size 32). For each mini batch, the generator (G) 130 predicts the fake DRR images. Then, the discriminator 140 is first trained separately to predict binary output with two images assigned to the generator output: when fake image (output set to zero: fake class) or when actual image (output set to one). Finally, using the combined G 130 and D 140 networks and the total loss L=$\xi$D+$\xi$G, a retropropagation of gradients is done to update the generator weight (W) (discriminator's weights are however frozen during this step of generator training).

The architecture for the U-Net generator G 130 is composed of 15 convolutional layers for image features encoding-decoding as explained in article [P. Isola, J.-Y. Zhu, T. Zhou, and A. A. Efros, "Image-to-Image Translation with Conditional Adversarial Networks," *CoRR*, vol. abs/1611.0, 2016.]. Dropout slices 134 are used in the three first decoding layer to foster a good generalization of the image-to-image translation model. The discriminator output neuron has a sigmoid activation function. In present example, the CNN input size was 256×256×1 (XRAY patch on one view) and the DRR output size was 256×256×3. One output channel is assigned for one different anatomical structure to separate them in training: the superior 146, middle 147 and inferior 148, vertebrae.

The pix-to-pix network uses a generative adversarial network (GAN) training procedure to train the parameters of the generator (weights). The generator has a U-Net architecture allowing an image-to-image mapping to convert an actual x-ray patch 143 to a DRR patch 144 (domain A to domain B). The whole network is composed of the U-Net generator 130 and a CNN discriminator 140. In present example, the GAN input size was 256×256×1 (x-ray patch 143) and the DRR 144 output size was 256×256×k, with k is defined as the number of anatomical structures in output, here 3 vertebra 146, 147 and 148. Thus, one output channel is assigned for each different anatomical structure (here each different vertebra) to separate them in training. There are defined k=3 output channels for the K=3 visible bone structures: the vertebra of interest 147 (Ki=1), and its superior 146 (Ki=0) and inferior 148 (Ki=2) neighbor vertebra.

Once trained, the network can convert the input image 143 (x-ray) belonging to a complex domain A into a simplified virtual x-ray (DRR-like) 144 belonging to domain B. The generator (U-Net shaped) 130 network can suppress the noise, the adjacent structures and the background of original image thank to the image conversion.

Using converted images allow to:
First, facilitate the image-image correspondence (similarity computation),
and second, separate the adjacent structures to avoid mismatching between them.

Used in a 3D/2D registration process scheme, these bones multi-structures pix-to-pix networks help the stage of similarity computation between the target DRR images generated using GAN U-Net) and varying images generated from 3D model. Since the similarity values are used as cost to find the optimal model parameter that maximizes the similarity between model and image, having both images belonging to the same domain variety allows to employ simpler similarity metrics, and induces fewer local maxima during optimization due to mismatching between adjacent structures.

The experimental set is now described. The dataset for the XRAY-to-DRR converters training includes bi-planar acquisitions (PA and LAT views) of 463 patients carried out with a system which is geometrically calibrated and with a known 3D environment. With a reconstructed 3D spine, which integrate a semi-automated 3D reconstruction method, in order to have the 3D models ground truth. For the assessment of the method proposed by embodiments of the invention, another clinical dataset of 40 adolescent idiopathic scoliosis patients (mean age 14-year, average main Cobb angle 56°) was used. A bronze standard was built for each 3D model to define ground truth as the mean of three expert's 3D reconstructions.

During the XRAY-to-DRR converters training, for each patient in the training dataset, PA and LAT DRR images were generated for each reconstructed 3D models individually using the algorithm previously presented.

Figure 11A:
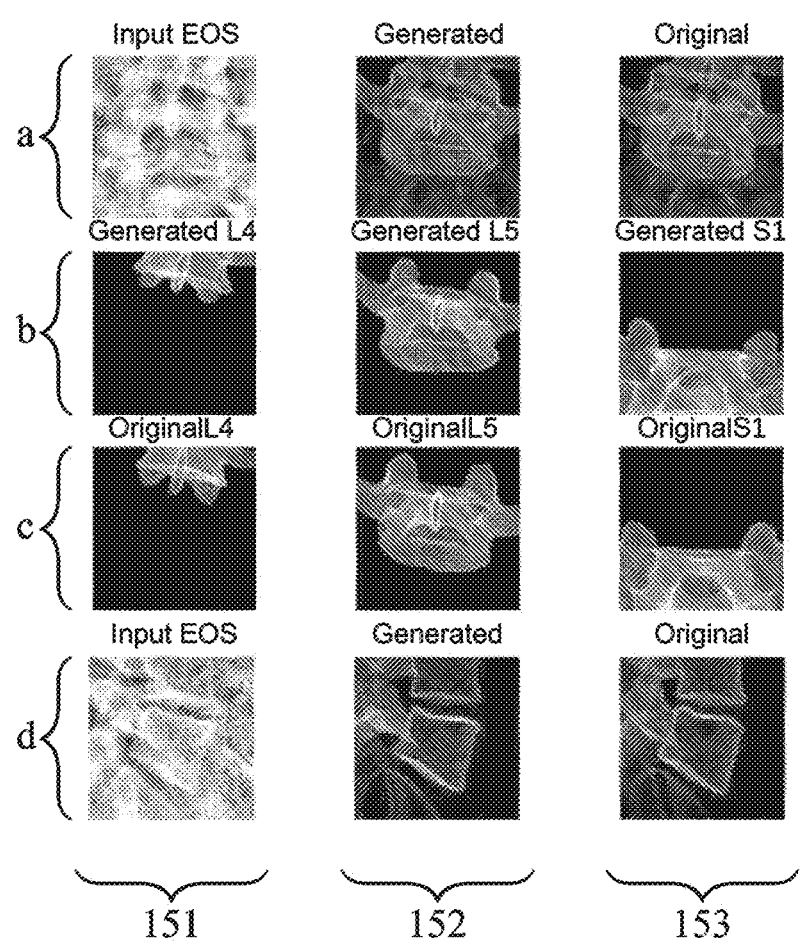
FIG. 11A shows an example of GAN-based XRAY-to-DRR conversions from actual x-ray image to a three channels DRR image corresponding to adjacent vertebra structures.

FIG. 11A shows an example of GAN-based XRAY-to-DRR conversions from actual x-ray image to a three channels DRR image corresponding to adjacent vertebra structures.

Image 151a is the frontal x-ray image to be converted, which represents from top to bottom: vertebra L4, vertebra L5, sacral plate S1.

Image 152a is the frontal DRR image generated from frontal x-ray image 151a, by the method proposed by embodiments of the invention. Each color represents an anatomical structure: red=vertebra L4, green=vertebra L5, blue=sacral plate S1.

Image 153a is the original frontal DRR image corresponding to frontal x-ray image 151a, and is the reference image to which the frontal DRR image 152a is to be compared in order to train the algorithm of the method proposed by embodiments of the invention.

Image 151b is the frontal DRR image generated from frontal x-ray image 151a, by the method proposed by embodiments of the invention, corresponding to vertebra L4 only. It also corresponds to the upper part of image 152a.

Image 152b is the frontal DRR image generated from frontal x-ray image 151a, by the method proposed by embodiments of the invention, corresponding to vertebra L5 only. It also corresponds to the middle part of image 152a.

Image 153b is the frontal DRR image generated from frontal x-ray image 151a, by the method proposed by embodiments of the invention, corresponding to sacral plate S1 only. It also corresponds to the lower part of image 152a.

Image 151c is the original frontal DRR image corresponding to frontal x-ray image 151a, and is the reference image to which the frontal DRR image 151b is to be compared, corresponding to vertebra L4 only. It also corresponds to the upper part of image 153a.

Image 152c is the original frontal DRR image corresponding to frontal x-ray image 151a, and is the reference image to which the frontal DRR image 152b is to be compared, corresponding to vertebra L5 only. It also corresponds to the middle part of image 153a.

Image 153c is the original frontal DRR image corresponding to frontal x-ray image 151a, and is the reference image to which the frontal DRR image 153b is to be compared, corresponding to sacral plate S1 only. It also corresponds to the lower part of image 153a.

Image 151d is the lateral x-ray image to be converted, which represents from top to bottom: vertebra L4, vertebra L5, sacral plate S1.

Image 152d is the lateral DRR image generated from lateral x-ray image 151d, by the method proposed by embodiments of the invention. Each color represents an anatomical structure: red=vertebra L4, green=vertebra L5, blue=sacral plate S1.

Image 153d is the original lateral DRR image corresponding to lateral x-ray image 151d, and is the reference image to which the lateral DRR image 152d is to be compared in order to train the algorithm of the method proposed by embodiments of the invention.

Following vertebra morphological changes along the spine, a per-view converter is trained for each spine segment: T1 to T5, T6 to T12 and L1 to L5. Twenty patches per vertebra are extracted around the vertebral body center (VBC) with random displacements, rotations and scales. The region of interest (ROI) was defined with a dynamic factor of reduction so that the vertebra of interest and at least the vertebral endplates of adjacent levels remain visible in a 256×256 pixels patch, the factor of reduction depending of vertebra's dimensions in images. Training dataset was split in two sets: train (70%) and test (30%). The training ran 100 epochs. At each epoch, the mean squared error (MSE), error on predicted patches (test set), was computed to select the best model over epochs. The lumbar converter (LAT view) training was configured with c=1 or c=3 (Eq. 7), i.e. with output image having only one channel or a layered image with three channels with the three vertebra DRRs. The MSE for the DRR of middle vertebra was 0.0112 and 0.0108 respectively for one and three channels thereby revealing that the additional output information of adjacent vertebrae helps the GAN training. Therefore, three output channels were used for each training, even if application to the 3D/2D registration of one vertebra 3D model will use the middle channel as target. Once trained, the network can convert an x-ray image into a layered image with a DRR image per structure, as can be seen on FIG. 11A. Qualitative results of converters are presented both in FIGS. 11A and 11B.

Figure 11B:
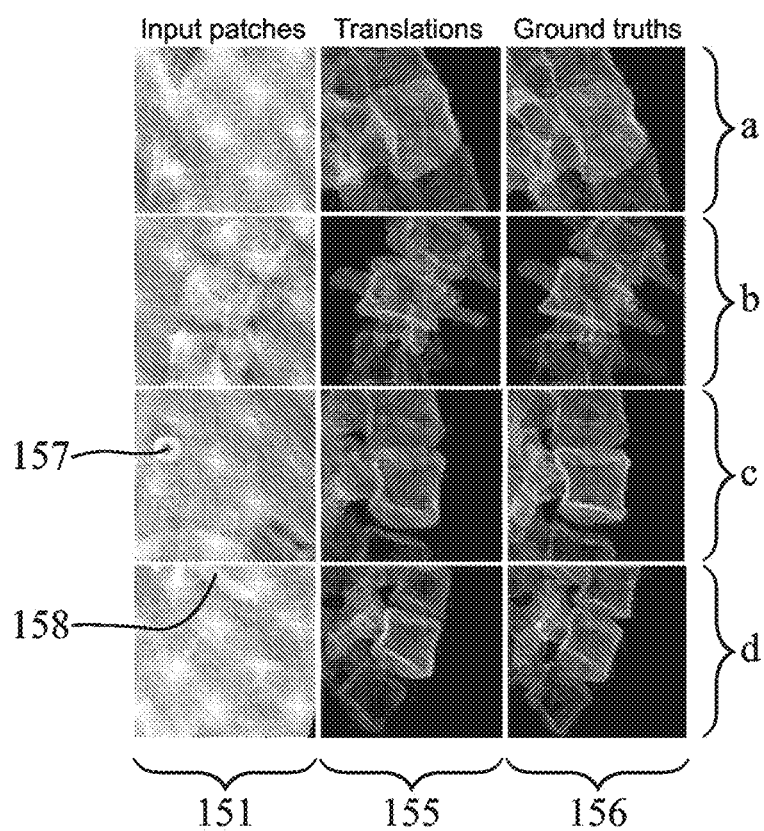
FIG. 11B shows conversions, also called translations, from x-ray domain to DRR domain, in poor conditions, to show robustness of the method proposed by embodiments of the invention.

FIG. 11B shows conversions, also called translations, from x-ray domain to DRR domain, in poor conditions, to show robustness of the method proposed by embodiments of the invention.

Image 154a is the frontal x-ray image to be converted, which represents from top to bottom: vertebra L4, vertebra L5, sacral plate S1. The x-ray image shows poor visibility.

Image 155a is the frontal DRR image generated from frontal x-ray image 154a, by the method proposed by embodiments of the invention, corresponding to a "translation" from x-ray domain to DRR domain. Each color represents an anatomical structure: red=vertebra L4, green=vertebra L5, blue=sacral plate S1.

Image 156a is the original frontal DRR image corresponding to frontal x-ray image 154a, and is the reference image to which the frontal DRR image 155a is to be compared in order to assess validity and performance of the algorithm of the method proposed by embodiments of the invention.

Image 154b is the frontal x-ray image to be converted, which represents from top to bottom: vertebra L4, vertebra L5, sacral plate S1. The x-ray image shows superimpositions.

Image 155b is the frontal DRR image generated from frontal x-ray image 154b, by the method proposed by embodiments of the invention, corresponding to a "translation" from x-ray domain to DRR domain. Each color represents an anatomical structure: red=vertebra L4, green=vertebra L5, blue=sacral plate S1.

Image 156b is the original frontal DRR image corresponding to frontal x-ray image 154b, and is the reference image to which the frontal DRR image 155b is to be compared in order to assess validity and performance of the algorithm of the method proposed by embodiments of the invention.

Image 154c is the frontal x-ray image to be converted, which represents from top to bottom: vertebra L4, vertebra L5, sacral plate S1. The x-ray image shows a circular metal part 157.

Image 155c is the frontal DRR image generated from frontal x-ray image 154c, by the method proposed by embodiments of the invention, corresponding to a "translation" from x-ray domain to DRR domain. Each color represents an anatomical structure: red=vertebra L4, green=vertebra L5, blue=sacral plate S1.

Image 156c is the original frontal DRR image corresponding to frontal x-ray image 154c, and is the reference image to which the frontal DRR image 155c is to be compared in order to assess validity and performance of the algorithm of the method proposed by embodiments of the invention.

Image 154d is the frontal x-ray image to be converted, which represents from top to bottom: vertebra L4, vertebra L5, sacral plate S1. The x-ray image shows a metallic screw 158.

Image 155d is the frontal DRR image generated from frontal x-ray image 154d, by the method proposed by embodiments of the invention, corresponding to a "translation" from x-ray domain to DRR domain. Each color represents an anatomical structure: red=vertebra L4, green=vertebra L5, blue=sacral plate S1.

Image 156d is the original frontal DRR image corresponding to frontal x-ray image 154d, and is the reference image to which the frontal DRR image 155d is to be compared in order to assess validity and performance of the algorithm of the method proposed by embodiments of the invention.

Similarity functions are now described. Five measures were implemented to assess the image similarity used in (Eq. 2). Thanks to the x-ray image conversion using the U-Net neural networks, the similarity is computed between two DRR-like images allowing to use common unimodal similarity functions, such as the normalized cross correlation (NCC) and the sum of squared differences (SSD). Measures based on image gradients were the normalized gradient information (NGI), and the NCC computed on gradient images (NCCGRAD). The normalized mutual information (NMI) measure was also included where joint histograms are computed from images binarized in 8 bits.

Vertebra Statistical Shape Model is now described. A deformable model is used when registration is elastic, such as when the shape of object is also optimized in addition to model pose. Deformation technic uses a mesh moving least square (MLS) deformation controlled by a set of geometrical parameters which are regularized using a PCA model. The prior definition of a simplified parametric model encompassing the object's shape allows for a compact representation of the geometry and directly provides subject-specific landmarks and geometrical primitives used for biomedical applications.

The resulting PCA model, that captures the principal variations, provides a linear generative model of the form: $s=\bar{s}+Bm$ where B is the PCA basis, $\bar{s}$ is the mean model, and m is a vector of deformation modes. The generation of a mesh instance with the function $\Psi(p)$ (Eq.4) is controlled with the parameters vector $p=\{Tx, Ty, Tz, Rx, Ry, Rz, Sx, Sy, Sz, m\}$ where $p \in \mathbb{R}^{3+3+3+|m|}$ composed of nine parameters for the affine part (translations, rotations and scales) to transform and scale the 3D model to the right pose in the x-ray calibrated 3D environment, and a shape vector m having $|m|$ PCA modes. Given a vector m, the MLS deformation handles parameters s which are computed and used to deform the mesh vertices.

Optimizer is now described. The cost function (Eq. 1) is optimized by minimized the following equation (Eq. 8) to solve the 3D/2D registration on bi-planar PA and LAT radiographs:

$$\hat{p}=\operatorname{argmin}_p[2-\Phi(I_{DRR3DM}^{PA}(p), I_{DRRGAN}^{PA})-\Phi(I_{DRR3DM}^{LAT}(p), I_{DRRGAN}^{LAT})] \quad \text{(Eq. 8)}$$

where $\Phi(I1, I2)$ is the similarity measure bounded to [0 1] for NGI, NCC, NCCGRAD, NMI, for SSD, the sum of both PA and LAT similarity scores was computed to define the cost. In order to minimize the cost function (Eq. 8), a derivative-free exploration CMA-ES optimizer was used. Each CMA-ES iteration evaluated 100 times the cost function to build the covariance matrix. Upper/lower bounds could be defined.

The method proposed by embodiments of the invention is now evaluated. Three kinds of experiment were done to assess the proposed approach in the context of 3D/2D registration of vertebra 3D models in bi-planar x-rays. First, target registration errors (TRE) of anatomical landmarks belonging to 3D model were reported to study the behavior of similarity metrics, with and without the GAN conversion step. Additional tests were done to show the advantage of structures separation in the XRAY-to-DRR conversion to be less sensitive to the initial pose. Finally, accuracy results of a fully automated 3D reconstruction of the spine are presented.

Target registration errors (TRE) is now described. In this experiment, seventeen vertebra 3D models, ranging from level T1 to L5, were first fitted on the ground truth 3D models previously reconstructed. The registration was configured to solve for a rigid body transformation, with six degrees of freedom. For each vertebra of each patient, a random transformation was applied to the 3D model. For translations Tx, Ty, Tz, shift of the model was done with a ±3 mm range using a random uniform law. For in-plane rotations, Rx and Ry, a range of ±5° was defined, while for the out-of-plane axial vertebral rotation Rz, ±15° was used. The upper and lower bounds were defined to these values too in the optimizer. The random transform was limited in range, in order that registration with original x-rays target can converge. Indeed, the 3D/2D registration is assessed with both DRRGAN and original XRAY targets in order to quantify the improvements brought by the GAN-based converters.

The U-Net output channel corresponding to the middle vertebra was used as target for DRRGAN image. The TRE was computed as the root mean square error of anatomical landmarks 3D position error after the registration. The landmarks extracted from the registered 3D models were the centers of superior and inferior endplates and the centers of left and right pedicles. A total of 40 (patients)×17 (vertebra levels)×4 (landmarks) measures were done for each similarity/target pairs.

Table 1 represents the quantitative TRE for each target/similarity pair.

TABLE 1

Quantitative TRE for each target/similarity pairs

| Target | Similarity measure | Error rate (TRE > 2.4 mm) | TRE (RMS mm) | Mean delta cost function | Mean CMA-ES iterations |
|---|---|---|---|---|---|
| DRR GAN | NGI | 19.9% | 2.12 | 0.29 | 57 |
|  | NCC | 17.5% | 1.99 | 0.15 | 37 |
|  | NCCGRAD | 26.5% | 2.52 | 0.24 | 46 |
|  | SSD | 20.1% | 2.11 | 1531 | 65 |
|  | NMI | 20.6% | 2.06 | 0.05 | 32 |
| Original XRAY | NGI | 51.9% | 3.6 | 0.05 | 40 |
|  | NCC | 65.6% | 4.7 | 0.08 | 33 |
|  | NCCGRAD | 43.1% | 3.3 | 0.08 | 40 |
|  | SSD | 85.4% | 5.33 | 1935 | 93 |
|  | NMI | 82.2% | 5.27 | 0.003 | 18 |

Table 1 compares the TRE results for the five similarity measures and the two targets, reports the error rate for landmarks with a TRE>2.4 mm, and reports the mean of cost function delta, i.e. the amplitude cost Δ=max(costs)−min (costs), and the average number of iteration for convergence, where stop tolerance criteria was fixed to 1 for SSD metric and 0.001 for the remaining metrics. When the step of image conversion is used, with DRRGAN used as target, the TRE results are almost similar for all similarity metrics, 1.99 to 2.12, excepted for a higher error for NCC GRAD, 2.52. When the target used is XRAY, because the DRR3DM images have limited similarity level with XRAY image, the SSD, NCC and NMI metrics drop the registration results. NMI have a quasi-null variation on cost showing convergence issues. Only the gradient-based metrics reach a TRE of 3.6 and 3.3 mm respectively for the NGI and NCCGRAD, as can be seen in Table 1. The similarity levels evolution during optimization are more important when using the DRRGAN. For instance, using NGI metric, the average delta of cost is 0.29, DRRGAN, compared to 0.05, XRAY, meaning that the cost evaluated is less sensitive when using the GAN-based converters, as can be seen in Table 1, what can help for a better convergence.

Figure 12B:
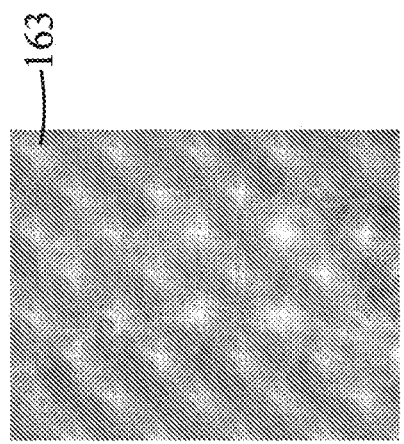
FIG. 12B shows an example of shifting vertically toward the top a vertebra.
Figure 12A:
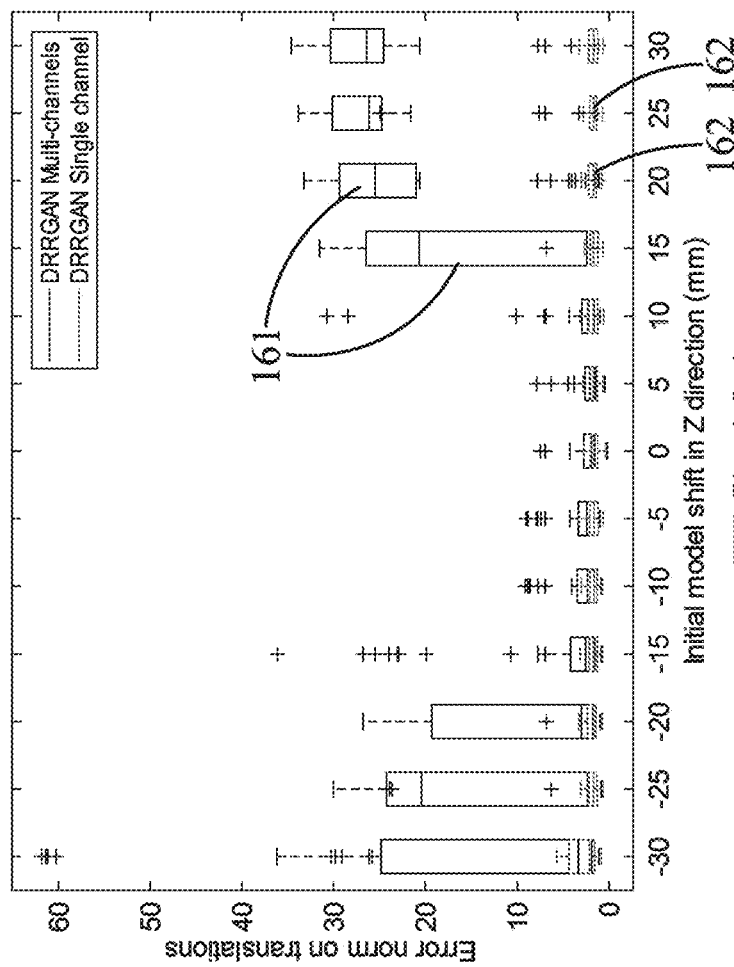
FIG. 12A shows the target registration error as a function of the initial pose shift in vertical axis.

FIG. 12A shows the target registration error as a function of the initial pose shift in vertical axis. This target registration error (TRE) is plotted on the ordinate axis as a function of different initial pose shifts along vertical axis z on the abscissa axis. For DRRGAN including the three vertebra structure (all channels flatted in one image), the value of the error exceeds often 5, even 10 or 20. The value of this error is important, and there is also great uncertainty on this value of error. For DRRGAN single channel, the value of the error is less than 5, most of time no more than 2 or 3. The value of this error is small, and there is also very small uncertainty on this value of error. This shows the great importance of the structure separations to avoid adjacent vertebra mismatching. Therefore, thanks to the method proposed by embodiments of the invention, since vertebrae are separated from one another, the value of the error is much smaller and much better known.

FIG. 12B shows an example of shifting vertically toward the top a vertebra. A vertebra is shifted vertically upside of +10 mm. This means that vertebra is 10 mm vertically higher than on the ground truth model.

In this experiment, the ground truth 3D models of L2 vertebra were shifted in the proximal-distal direction, that is along z axis, as can be seen in case of FIGS. 12A and 12B, in a ±30 mm range by step of 5 mm, giving thereby 13 initial poses. Then, a rigid body registration is done using, as DRRGAN target image, either a single channel, corresponding to the middle vertebra, or an image constructed with all channels flatted, thereby mixing the superior, middle and inferior vertebra structure. The metric used was the SSD, and the upper and lower bounds were defined to ±5 mm for Tx and Ty, ±32 mm for Tz and ±5° for rotations. FIG. 12A shows the boxplots of the translation residuals, for the 40 patients, for each initial pose shift. The residual transforms after registration had important errors behind an absolute shift of 10 mm without structure separation as can be seen on FIG. 12A. Even for absolute shifts <10 mm, some outliers occur because the registration is perturbed by adjacent levels L1 and L3. When using the GANDRR converted images, the structure of interest is isolated, and the registration process captures a larger range of initial pose and is more accurate.

Sensitivity to initial pose is now studied. For the registration of a mono-structure 3D model in a scene composed of periodic multi-structures, such as vertebrae along the spine, the sensitivity to the initial model's pose, for instance coming from an automated coarse registration, is studied because behind a limit, the 3D model registration would run the risk to converge wrongly on adjacent structures.

Accuracy of vertebrae pose and shape is now investigated. In this experiment, a fully automated 3D reconstruction of the spine is assessed. The initial solution of vertebra's 3D model shapes and poses were provided by a CNN-based automated method as explained in article [B. Aubert, C. Vazquez, T. Cresson, S. Parent, and J. De Guise, "Towards automated 3D Spine reconstruction from biplanar radiographs using CNN for statistical spine model fitting", *IEEE Trans. Med. Imaging*, p.1 2019]. This method provides a pre-personalized statistical spine model (SSM) with the endplate and pedicle centers detected on the bi-planar x-ray, for levels C7 to L5. In order to fine tune these obtained 3D models, the 3D/2D registration is applied in elastic mode, with |m|=20 PCA modes bound to ±3. The registration was done level by level individually using the NCC metric. Then, the resulting registered model is used to update the SSM regularization in order to obtain the final model after the local 3D/2D fit.

Table 2 represents quantitative landmarks TRE for 3D/2D registration of vertebrae.

TABLE 2

Quantitative landmarks TRE for 3D/2D registration of vertebrae

| | Regions | | | | | |
| --- | --- | --- | --- | --- | --- | --- |
| | Initial solution | | | Proposed 3D/2D registration | | |
| 3D errors (mm) | Mean ± SD | TRE (RMS) | Error rate > 2.4 mm | Mean ± SD | TRE (RMS) | Error rate > 2.4 mm |
| Pedicles | 2.7 ± 1.3 | 3 | 53.5% | 1.9 ± 1.0 | 2.2 | 26.9% |
| Endplate centers | 2.2 ± 1.1 | 2.5 | 34% | 1.7 ± 0.9 | 1.9 | 18.6% |
| Endplate corners | 2.6 ± 1.3 | 2.9 | 50.8% | 2.1 ± 1.1 | 2.3 | 31.7% |
| Global | 2.6 ± 1.3 | 2.8 | 48.5% | 2.0 ± 1.0 | 2.2 | 28.7% |

The landmark 3D positions of endplate centers and corners, and pedicles centers were improved by the proposed 3D/2D registration step, as can be seen in Table 2. The most important refinement was observed for the pedicle's centers with a TRE of 3 and 2.2 mm respectively before and after the fine 3D/2D registration, as can be seen in Table 2. The error rate, for errors >2.4 mm, dropped by 26.4%, 15.4% and 19.1% respectively for pedicles, and endplate's centers and corners.

Table 3 represents quantitative errors on vertebra positions and orientations.

TABLE 3

| Quantitative errors on vertebra positions and orientations (Mean ± SD) | | | | | | |
|---|---|---|---|---|---|---|
| Regions | X (mm) | Y (mm) | Z (mm) | L (°) | S (°) | A (°) |
| Cervical | −0.1 ± 0.6 | −0.5 ± 0.6 | 0.1 ± 0.8 | 1.9 ± 2.6 | 0.2 ± 3.8 | −0.5 ± 3.5 |
| Thoracic | 0.0 ± 1.5 | 0.2 ± 1.0 | 0.3 ± 0.7 | 0.5 ± 2.8 | 1.0 ± 2.3 | 0.8 ± 4.2 |
| Lumbar | −0.2 ± 0.7 | −0.0 ± 0.8 | 0.4 ± 0.5 | −1.0 ± 2.0 | 0.2 ± 2.1 | 1.3 ± 2.6 |
| All | −0.0 ± 1.3 | 0.1 ± 0.9 | 0.3 ± 0.7 | 0.0 ± 2.7 | 0.8 ± 2.3 | 0.9 ± 3.8 |

An axis coordinate system is defined for each vertebra using the pedicle and endplate centers. The 3D position error of each vertebra object is computed for each spine segment in term of positions and orientations agreement versus the ground truth 3D models, as can be seen in Table 3. All translations had mean error inferior or equal to 0.5 mm showing the low systematic bias of this method. Standard deviation was more important for X translation, i.e. position in lateral view, especially for thoracic levels, as can be seen in Table 3.

Finally, the shape accuracy was estimated by computing the node-to-surface distance errors using 3D model of reference reconstructed from CT-Scan images of 4 patients for those there were simultaneously bi-planar acquisitions and CT-Scan images. The volume resolution was 0.56× 0.56×1 mm, and the segmentation was done with the 3D Slicer software.

Figure 13B:
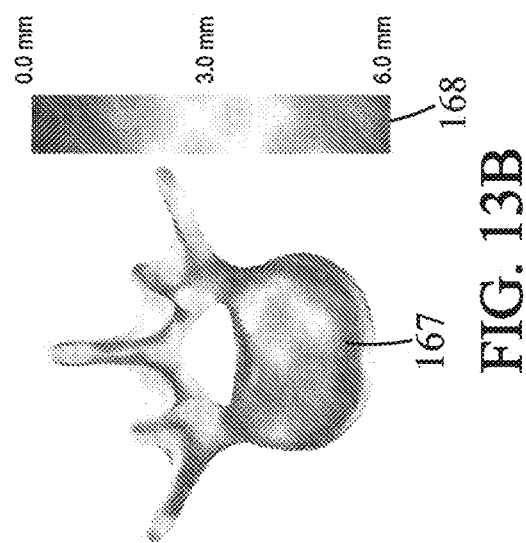
FIG. 13B shows distance map of error maxima calculated for the L3 vertebra.
Figure 13A:
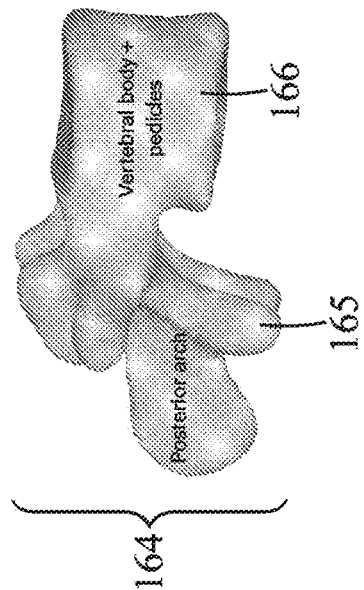
FIG. 13A shows anatomical regions used to compute node-to-surface statistic distances.

FIG. 13A shows anatomical regions used to compute node-to-surface statistic distances. In the vertebra 164, posterior arch 165 can be distinguished from structure 166 representing vertebral body and pedicles.

FIG. 13B shows distance map of error maxima calculated for the L3 vertebra. The different regions of the map 167 represented usually by different colored zones of the map 167 correspond to different values ranging from 0.0 mm to 6.0 mm (top down) with a middle value at 3.0 mm on the scale 168 represented on the right side of the map 167.

Table 4 represents the shape accuracy results versus the CT-Scan models.

TABLE 4

| SHAPE ACCURACY RESULTS VERSUS CT-SCAN MODELS | | | | | |
|---|---|---|---|---|---|
| | Models (N = 4) | | | | |
| | L1 | L2 | L3 | L4 | L5 |
| | | | Nodes # | | |
| Errors | 2847 | 2819 | 2750 | 2843 | 2484 |
| | | | Mean ± SD | | |
| Vertebral body + pedicles | 0.9 ± 1.0 | 0.9 ± 1.1 | 0.9 ± 0.9 | 0.8 ± 0.9 | 1.0 ± 1.1 |
| Posterior arch | 1.3 ± 1.7 | 1.3 ± 1.6 | 1.3 ± 1.6 | 1.3 ± 1.6 | 1.4 ± 1.7 |
| Whole model | 1.1 ± 0.9 | 1.1 ± 0.8 | 1.1 ± 0.9 | 1.1 ± 0.8 | 1.2 ± 1.0 |

The objects were rigidly aligned, and the node-to-surface distances were computed. The mesh densities of the models, i.e. their number of nodes, are specified in Table 4. The error statistics are reported in Table 4 for different anatomical regions which are the mesh of the whole vertebra 164, or of the posterior arch 165, or of the structure 166 encompassing vertebra body and pedicles, as is represented on FIG. 13A. Average errors ranged from 1.1 to 1.2 mm, as can be seen in Table 4. According to the error distance map 167 represented on FIG. 13B, the errors maxima are localized on the posterior arch region 165.

The method proposed by embodiments of the invention adds a prior step of image-to-image conversion of the target image in intensity-based 3D/2D registration process in order to have a robust dual image matching where both images belong to different domains, x-ray and DRR, and in order to appear with different environments and numbers of structures. As a first benefit, the XRAY-to-DRR converters improve the level of similarity between two images by bringing the target image to the same domain of the varying image, as can be seen on Table 1. The conversion step reduces the dependence to the choice of the similarity metric, and it even enables using common unimodal metric, as can be seen on Table 1, as well as using simplified DRR generation. This is an interesting property, as traditional experimental approach consisted to select the better metric over a set of metrics. However, this often resulted in a trade-off, because some of these metrics would give good or bad results, strongly depending on specific cases.

As a second benefit, mismatching between adjacent and superimposed structure are avoided by selecting the structure of interest in the converter output, as can be seen on FIG. 13A. Indeed, the structures were directly isolated in the original 3D volume to generate a regional DRR per object, and each DRR was assigned to a separate layer in the multi-channel output image of the XRAY-to-DRR converter. In cited prior art, US 2019/0259153, previous work using a XRAY-to-DRR converter produced only a global DRR which allowed for recovering segmentation mask of each organ, but not for generating a regional DRR per object.

Applied to the fully automated 3D reconstruction of the spine from bi-planar radiographs, the added 3D/2D registration step of refinement improves both object localization and shape, as can be seen in Tables 2 and 3, compared to the CNN-based automated method used for initialization. The mean error on landmark 3D localization was 2±1 mm, better than 2.7±1.7 mm found by a CNN-based displacement regression method for pedicles detection, or better than 2.3±1.2 found by a non-linear spine model fit using 3D/2D Markov random field. Compared to a "quasi" automated 3D reconstruction method, requiring user input of both spinal curves in both views and rigid manual adjustment once the model is fitted on bi-planar x-rays, the 3D/2D registration algorithm proposed by embodiments of the invention achieved better result for all pose parameters on a population with more severe scoliosis.

The reference method integrated in SterEOS® software, used in clinical routine to carry out spine 3D reconstruction, studied the shape accuracy of reconstructed objet versus ground truth object derived from CT-Scan. To be more accurate, this method requires a time-consuming manual elastic 3D/2D registration (more than 10 minutes) to adapt the vertebra projected contours to x-ray information. The automated local fit step, hereby proposed, taking less than one minute of computational time, advantageously suppresses the operator dependence and achieved similar accuracy results, such as (mean±2SD) 0.9±2.2 for the vertebral body and pedicles regions, and 1.3±3.2 for posterior arch region, compared to 0.9±2.2 and 1.2±3 mm in some previous study.

Adopting these resulting generated images instead of the actual x-rays allows for a robust unimodal image correspondence without structure mismatching. This solution integrated in a 3D/2D non-rigid registration process aiming to adjust vertebra 3D models from bi-planar x-rays improves the accuracy results, as has been seen previously.

Figure 15:
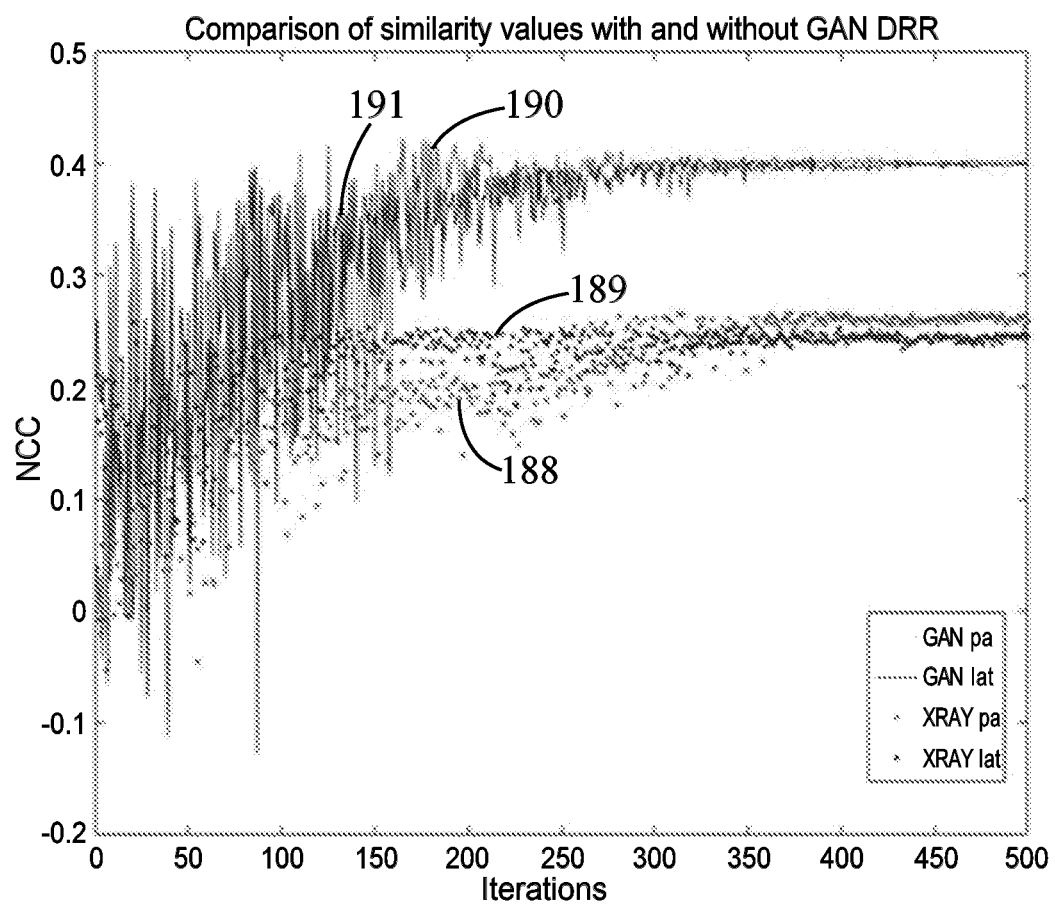
FIG. 15 shows a similar result with the GNCC (gradients normalized cross correlation) metric, as in FIG. 14B.
Figure 16:
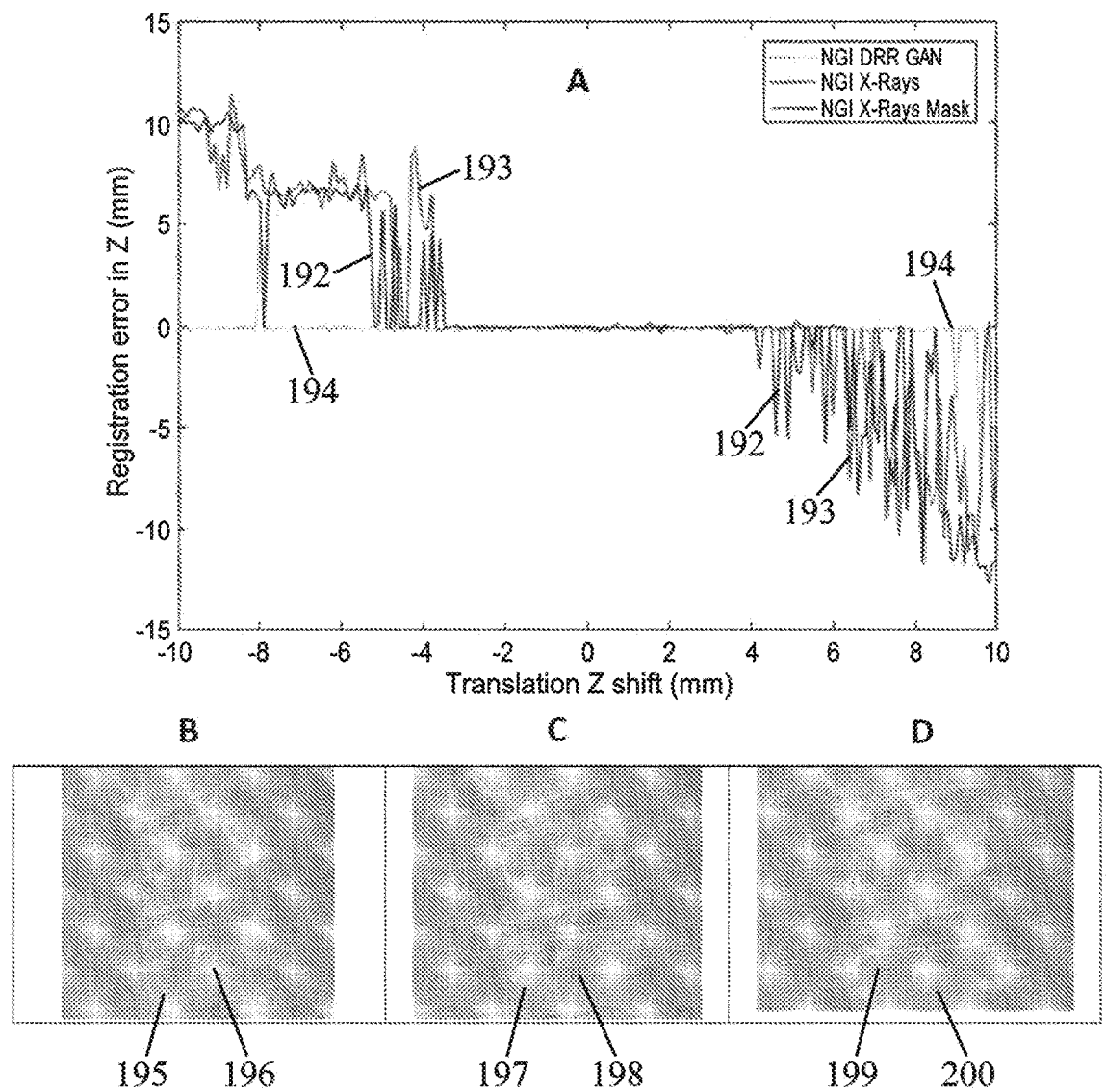
FIG. 16 shows the results of a target registration error (TRE) test in Z direction (vertical image direction).

Some other results are now enclosed to show the improvement brought by using the prior image-to-image translation, both with respect to better similarity values (FIGS. 14A-14B-14C-14D-15) and to anatomical structures mismatching prevention (FIG. 16).

FIG. 14A shows the costs values for PA and LAT views using GAN DRR as compared to actual x-rays images. Cost value is expressed on the ordinate axis as a function of the numbers of iterations on the abscissa axis. Curve 171 shows a higher cost function for the x-ray image whereas curve 172 shows a lower, and hence better, cost function for the GAN DRR image.

FIG. 14B shows the similarity values for PA and LAT views using GAN DRR as compared to actual x-rays images. Similarity value is expressed on the ordinate axis as a function of the numbers of iterations on the abscissa axis. For frontal view, curve 173 shows a lower similarity function for the x-ray image, whereas curve 175 shows a higher, and hence better, similarity function for the GAN DRR image. For lateral view, curve 174 shows a lower similarity function for the x-ray image, whereas curve 176 shows a higher, and hence better, similarity function for the GAN DRR image. The similarity values of the NGI (normalized gradient information) metric reach higher value when using the generated DRR GAN than when using the actual x-rays image.

Figure 14C:
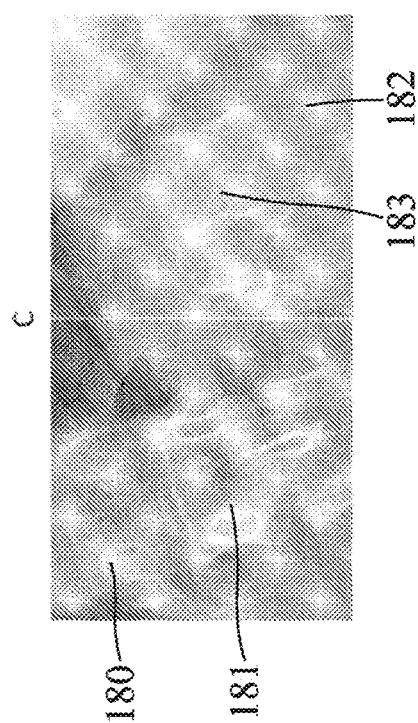
FIG. 14C shows the better fit which is observed for the registration result when using a DRR generated by GAN, as compared to FIG. 14D using actual x-rays images.
Figure 14D:
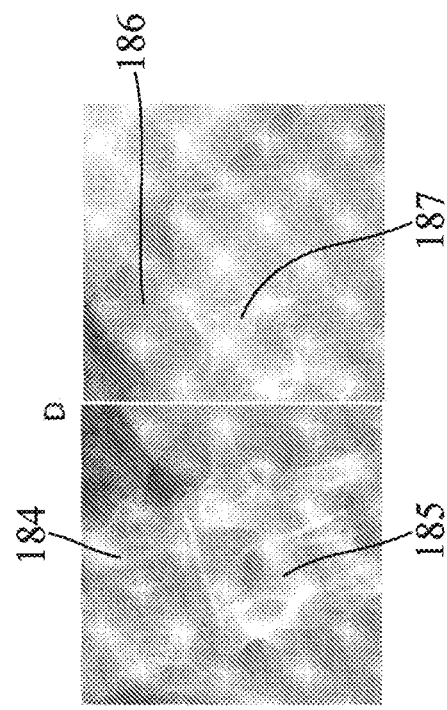
FIG. 14A shows the costs values for PA and LAT views using GAN DRR as compared to actual x-rays images.
FIG. 14B shows the similarity values for PA and LAT views using GAN DRR as compared to actual x-rays images.

FIG. 14C shows the better fit which is observed for the registration result when using a DRR generated by GAN, as compared to FIG. 14D using actual x-rays images. Indeed, in FIG. 14C, on the left part representing the frontal view, the fit between the generated image 181 and the target image 180 first converted in DRR domain is better than the fit, in FIG. 14D, on the left part representing the frontal view, between the generated image 185 and the target image 184 kept in the x-ray domain. Also, in FIG. 14C, on the right part representing the lateral view, the fit between the generated image 183 and the target image 182 first converted in DRR domain is better than the fit, in FIG. 14D, on the right part representing the lateral view, between the generated image 187 and the target image 186 kept in the x-ray domain.

FIG. 15 shows a similar result with the GNCC (gradients normalized cross correlation) metric, as in FIG. 14B. For frontal view, curve 190, with GAN DRR, shows a higher and better similarity than curve 188, without GAN DRR. For lateral view, curve 191, with GAN DRR, shows a higher and better similarity than curve 189, without GAN DRR.

FIG. 16 shows the results of a target registration error (TRE) test in Z direction (vertical image direction). In A part, the different registrations errors expressed in mm on the ordinate axis are plotted as functions of the vertical translation shift expressed in mm too on the abscissa axis. The NGI DRR curve 194 shows much lower errors than the NGI x-rays mask curve 192 which in turn shows lower errors than the NGI x-rays curve 193. In B part, a Z translation shift from −10 mm is shown by the relative position between points 196 and spine structure 195. In C part, neutral translation is shown by the relative position between points 198 and spine structure 197. In part D, a Z translation shift from 10 mm is shown by the relative position between points 200 and spine structure 199.

The TRE test aimed to transform the 3D model with a known theoretical transformation and then to analyze residual errors of registration between theoretical and recovered transformations. It can be seen that using the generated GAN DRR is less initial-position dependent. It can also be seen that the target registration error (TRE) increases much after a Z shift of ±4 mm, showing then an important structure mismatching between neighbors (vertebral endplates) occurring if the generated GAN DRR image is not used, corresponding to curves 192 and 193 on part A of FIG. 16.

The invention has been described with reference to preferred embodiments. However, many variations are possible within the scope of the invention.

The invention claimed is:

1. A medical imaging conversion method comprising:
   automatically converting:
   at least one or more real x-ray images of a patient, including at least a first anatomical structure of said patient and a second anatomical structure of said patient,
   into at least one digitally reconstructed radiograph (DRR) of said patient representing said first anatomical structure without representing said second anatomical structure,
   by a single operation using either one convolutional neural network (CNN) or a group of convolutional neural networks (CNN) which is preliminarily trained to, both or simultaneously:
   differentiate said first anatomical structure from said second anatomical structure by isolating said anatomical structures directly in an original 3D volume, and
   convert a real x-ray image into at least one digitally reconstructed radiograph (DRR) by one of:
   (i) simultaneously producing a set of several DDRs, each of the DDRs focused on only one anatomical structure of interest, and
   (ii) producing one DDR which is only focused on one anatomical structure of interest excluding the other anatomical structures.

2. The medical imaging conversion method according to claim 1, wherein the method also automatically converts:
   said real x-ray image of said patient,
   into at least another digitally reconstructed radiograph (DRR) of said patient representing said second anatomical structure without representing said first anatomical structure,
   by said same single operation, where said either one convolutional neural network (CNN) or group of convolutional neural networks (CNN) is preliminarily trained to, both or simultaneously:
   differentiate said first anatomical structure from said second anatomical structure,
   and convert a real x-ray image into at least two digitally reconstructed radiographs (DRR).

3. A medical imaging conversion method comprising:
   automatically converting:
   at least one or more real x-ray images of a patient, including at least a first anatomical structure of said patient and a second anatomical structure of said patient, both into at least a first digitally reconstructed radiograph (DRR) and a second digitally reconstructed radiograph (DRR) of said patient:
said first digitally reconstructed radiograph (DRR) representing said first anatomical structure without representing said second anatomical structure,
said second digitally reconstructed radiograph (DRR) representing said second anatomical structure without representing said first anatomical structure,
by a single operation using either one convolutional neural network (CNN) or a group of convolutional neural networks (CNN) which is preliminarily trained to, both or simultaneously:
differentiate said first anatomical structure from said second anatomical structure by isolating said anatomical structures directly in an original 3D volume, and
convert a real x-ray image into at least two digitally reconstructed radiographs (DRR) by one of:
(i) simultaneously producing a set of several DDRs, each of the DDRs focused on only one anatomical structure of interest, and
(ii) producing one DDR which is only focused on one anatomical structure of interest excluding the other anatomical structures.

4. The medical imaging conversion method according to claim 3, wherein said either one convolutional neural network (CNN) or group of convolutional neural networks (CNN) is a single generative adversarial network (GAN).

5. The medical imaging conversion method according to claim 4, wherein said single generative adversarial network (GAN) is a U-Net GAN or a Residual-Net GAN.

6. The medical imaging conversion method according to claim 3, wherein said real x-ray image of said patient is a direct capture of said patient by an x-ray imaging apparatus.

7. The medical imaging conversion method according to claim 3, wherein:
said first and second anatomical structures of said patient are anatomical structures which are:
neighbors to each other on said real x-ray image,
or even adjacent to each other on said real x-ray image,
or even touching each other on said real x-ray image,
or even at least partly superposed on said real x-ray image.

8. The medical imaging conversion method according to claim 3, wherein only one of said at least two digitally reconstructed radiographs (DRR) is used for further processing.

9. The medical imaging conversion method according to claim 3, wherein all of said at least two digitally reconstructed radiographs (DRR) is used for further processing.

10. The medical imaging conversion method according to claim 3, wherein:
said real x-ray image of a patient includes at least three anatomical structures of said patient,
said real x-ray image is converted, by said single operation, into at least three separate digitally reconstructed radiographs (DRR) respectively representing said at least three anatomical structures, each of said digitally reconstructed radiographs (DRR) representing only one of said anatomical structures without representing any other one of said anatomical structures.

11. The medical imaging conversion method according to claim 3, wherein:

said either one convolutional neural network (CNN) or the group of convolutional neural networks (CNN) has been preliminarily trained, by a set of training groups of:
one real x-ray image, and
at least one or more corresponding digitally reconstructed radiographs (DRR) each representing only one of said anatomical structures, but representing no other anatomical structure of said patient.

12. The medical imaging conversion method according to claim 11, wherein said digitally reconstructed radiographs (DRR) of said training groups come from a 3D model specific to said patient via its adaptation to two real x-rays images taken along two orthogonal directions.

13. The medical imaging conversion method according to claim 3, wherein:
said either one convolutional neural network (CNN) or the group of convolutional neural networks (CNN) has been preliminarily trained, by a set of:
real x-ray images, and
several subsets of at least one or more digitally reconstructed radiographs (DRR), each of said digitally reconstructed radiographs (DRR) representing only one of said anatomical structures, but representing no other anatomical structure of said patient.

14. The medical imaging conversion method according to claim 13, wherein said digitally reconstructed radiographs (DRR) of said training groups come from a 3D model specific to said patient via its adaptation to two real x-rays images taken along two orthogonal directions.

15. The medical imaging conversion method according to claim 3, wherein:
said either one convolutional neural network (CNN) or group of convolutional neural networks (CNN) has been preliminarily trained, by a set of training groups of:
both one frontal real x-ray image and one lateral real x-ray image, and
at least one or more subsets of frontal and lateral corresponding digitally reconstructed radiographs (DRR), each said subset representing only one of said anatomical structures, but representing no other anatomical structure of said patient.

16. The medical imaging conversion method according to claim 15, wherein said digitally reconstructed radiographs (DRR) of said training groups come from a 3D model specific to said patient via its adaptation to two real x-rays images taken along two orthogonal directions.

17. The medical imaging conversion method according to claim 3, wherein said different anatomical structures of said patient are contiguous vertebra of said patient.

18. The medical imaging conversion method according to claim 17, wherein:
said different and contiguous vertebra of said patient are located within a single and same region of patient spine among:
either a region of upper thoracic patient spine segment,
or a region of lower thoracic patient spine segment,
or a region of lumbar patient spine segment,
or a region of cervical patient spine segment,
or a region of patient pelvis.

19. The medical imaging conversion method according to claim 3, wherein:
said different anatomical structures of said patient are located within a single and same region of patient among:
either a region of patient hip, or a region of patient lower limbs,
or a region of patient knee,
or a region of patient shoulder,
or a region of patient rib cage.

20. The medical imaging conversion method according to claim 3, wherein:
each of said different digitally reconstructed radiographs (DRR) representing respectively said different anatomical structures of said patient includes simultaneously:
an image having pixels presenting different gray levels,
at least one tag representing anatomical information relative to anatomical structure it represents.

21. The medical imaging conversion method according to claim 20, wherein said image is a 256×256 pixels square image.

22. The medical imaging conversion method according to claim 3, wherein said either one convolutional neural network (CNN) or group of convolutional neural networks (CNN) has been preliminarily trained on x-ray images, both real x-ray images and transformations of real x-ray images, of a number of different patients ranging from 100 to 1000.

23. The medical imaging conversion method according to claim 3, wherein at least both a frontal real x-ray image of a patient and a lateral real x-ray image of said patient are converted, both said x-ray images each including same said anatomical structures of said patient.

24. Medical imaging 3D model personalization method comprising a medical imaging conversion method according to claim 23, wherein:
a 3D generic model is used to generate:
at least one or more digitally reconstructed radiographs (DRR) of a frontal view of said patient, representing respectively said one or more anatomical structures of said patient,
and at least one or more digitally reconstructed radiographs (DRR) of a lateral view of said patient, representing respectively said one or more anatomical structures of said patient,
a frontal real x-ray image is converted, by said medical imaging conversion method, into:
at least one or more digitally reconstructed radiographs (DRR) of a frontal view of said patient, representing respectively said one or more anatomical structures of said patient,
a lateral real x-ray image is converted, by said medical imaging conversion method, into:
at least one or more digitally reconstructed radiographs (DRR) of a lateral view of said patient, representing respectively said one or more anatomical structures of said patient,
and wherein:
said at least one or more digitally reconstructed radiographs (DRR) of a frontal view of said patient, representing respectively said one or more anatomical structures of said patient and obtained from said 3D generic model, are respectively mapped with said at least one or more digitally reconstructed radiographs (DRR) of a frontal view of said patient, representing respectively said one or more anatomical structures of said patient and obtained from said frontal real x-tray image,
and said at least one or more digitally reconstructed radiographs (DRR) of a lateral view of said patient, representing respectively said one or more anatomical structures of said patient and obtained from said 3D generic model, are respectively mapped with said at least one or more digitally reconstructed radiographs (DRR) of a lateral view of said patient, representing respectively said one or more anatomical structures of said patient and obtained from said lateral real x-tray image,
so as to generate a 3D patient specific model from said 3D generic model.

25. The medical imaging 3D model personalization method according to claim 24, wherein:
said 3D generic model is a deformable model.

26. The medical imaging 3D model personalization method according to claim 25, wherein:
said deformable model is a statistical shape model.

27. A medical imaging conversion method comprising: automatically converting:
at least one or more images of a patient in a first domain, including at least a first anatomical structure of said patient and a second anatomical structure of said patient,
into at least an image of said patient in a second domain, representing said first anatomical structure without representing said second anatomical structure,
by a single operation using either one convolutional neural network (CNN) or a group of convolutional neural networks (CNN) which is preliminarily trained to, both or simultaneously:
differentiate said first anatomical structure from said second anatomical structure by isolating said anatomical structures directly in an original 3D volume, and
convert an image in a first domain into at least one image in a second domain by one of:
(i) simultaneously producing a set of several DDRs, each of the DDRs focused on only one anatomical structure of interest, and
(ii) producing one DDR which is only focused on one anatomical structure of interest excluding the other anatomical structures.

28. A medical imaging conversion method comprising: automatically converting:
at least one or more global images of a patient in a first including at least several different anatomical structures of said patient,
into several regional images of said patient in a second domain, respectively representing said different anatomical structures,
by a single operation using either one convolutional neural network (CNN) or a group of convolutional neural networks (CNN) which is preliminarily trained to, both or simultaneously:
differentiate said anatomical structures from one another by isolating said anatomical structures directly in an original 3D volume, and
convert an image in a first domain into at least one image in a second domain by one of:
(i) simultaneously producing a set of several DDRs, each of the DDRs focused on only one anatomical structure of interest, and
(ii) producing one DDR which is only focused on one anatomical structure of interest excluding the other anatomical structures.

* * * * *